United States Patent [19]
Worsley et al.

[11] Patent Number: 5,521,928
[45] Date of Patent: May 28, 1996

[54] TIME SLOT EXCHANGER MECHANISM IN A NETWORK FOR DATA COMMUNICATION HAVING ISOCHRONOUS CAPABILITY

[75] Inventors: Debra J. Worsley, Vista; Brian C. Edem; Michael S. Evans, both of San Jose, all of Calif.

[73] Assignee: National Semiconductor Corporation, Santa Clara, Calif.

[21] Appl. No.: 439,440

[22] Filed: May 11, 1995

Related U.S. Application Data

[63] Continuation of Ser. No. 146,337, Nov. 1, 1993, abandoned, which is a continuation-in-part of Ser. No. 969,916, Nov. 2, 1992, abandoned.

[51] Int. Cl.[6] .................... H04J 3/06; H04L 12/427
[52] U.S. Cl. ............... 370/67; 370/68; 370/85.15; 370/108
[58] Field of Search ............... 370/66, 94.3, 67, 370/16.1, 68, 94.2, 60, 110.1, 100.1, 105.1, 105.3, 85.15, 85.1, 95.1, 85.7, 91, 85.4, 85.5, 108; 340/825.05; 375/368, 371

[56] References Cited

U.S. PATENT DOCUMENTS

| | | | |
|---|---|---|---|
| 4,220,816 | 9/1980 | Howells et al. | 340/24 |
| 4,258,434 | 3/1981 | Glowinski et al. | 370/60 |
| 4,412,324 | 10/1983 | Glowinsky et al. | 370/58.1 |
| 4,445,213 | 4/1984 | Baugh et al. | 370/94.1 |
| 4,530,088 | 7/1985 | Hamstra et al. | 370/110.1 |
| 4,549,292 | 10/1985 | Isaman et al. | 370/85.15 |
| 4,577,312 | 3/1986 | Nash | 370/84 |
| 4,587,650 | 5/1986 | Bell | 340/825,05 |
| 4,637,014 | 1/1987 | Bell et al. | 370/85.15 |
| 4,646,291 | 2/1987 | Perntz et al. | 370/100.1 |
| 4,766,590 | 8/1988 | Hamada et al. | 370/85.15 |
| 4,766,591 | 8/1988 | Huang | 370/60 |
| 4,817,088 | 3/1989 | Adams | 370/100.1 |
| 4,823,365 | 4/1989 | Loginov | 375/118 |
| 4,845,609 | 7/1989 | Lighthart et al. | 364/250 |
| 4,922,438 | 5/1990 | Ballweg | 370/85.15 |
| 4,941,141 | 6/1990 | Hagano | 370/68 |
| 4,961,188 | 10/1990 | Lau | 370/94.2 |
| 4,985,891 | 1/1991 | Fujiwara et al. | 370/110.1 |
| 5,001,707 | 3/1991 | Kositpaiboon et al. | 370/94.1 |
| 5,121,392 | 6/1992 | Sakalian | 375/118 |
| 5,123,012 | 6/1992 | Suzuki et al. | 370/66 |
| 5,224,213 | 6/1993 | Dieffenderfer et al. | 395/250 |
| 5,282,196 | 1/1994 | Clebowicz | 370/58.1 |

OTHER PUBLICATIONS

Integrated PBX Systems, An NCC State of the Art Report, The National Computing Centre Limited, 1987.

ISDN Basic Rate Interface System Design Guide, Telenetworks document, Aug., 1989.

ISDN Primary Rate Interface System Design Guide, Telenetworks, document, Jul., 1989.

IEEE 802.3 Draft Supplement to IEEE Std 802.3 CSMA/CD Access Method and Physical Layer Specifications, Institute of Electrical and Electronics, Nov., 1989.

A communication system proposal presented to representatives of Apple Computer on Mar. 5, 1990.

Irube et al., "Integrated Information and Communication System for Business Networks" *Hitachi Review* 40(3):241–247 (1991).

HMUX ERS "FDDI–II Hybrid Multiplexor (HMUX)" Rev. 2.4, (Mar. 25, 1991).

(List continued on next page.)

*Primary Examiner*—Wellington Chin
*Assistant Examiner*—Chau T. Nguyen
*Attorney, Agent, or Firm*—Limbach & Limbach

[57] ABSTRACT

An apparatus and method for transferring data between two entities in a time slot interchange fashion. The apparatus and method includes a buffer memory comprised of three sections to accommodate up to one cycle of skew between the two independently operating entities. Cycle start detection logic coupled to the two entities controls or, as implemented in the preferred embodiment, designates a physical location within the buffer memory for each of the three sections upon receipt of cycle start reference signals from the two entities.

26 Claims, 14 Drawing Sheets

OTHER PUBLICATIONS

On or about Nov. 1, 1991, IBM Corporation provided a "Task Order" and appendix. A copy of pp. 6 and 7 of the Task Order and appendix titled, Isoethernet Project Local Cluster Controller Version 1.2.

"Exchangeable Card Architecture Specification," Release 1.00, bearing the date Dec. 20, 1991, pp. 7, 20 and 22.

"PCMCIA Socket Services Interface Specification," Draft 2.00b, bearing the date Jul. 17, 1992.

"VersaNet™ An Ethernet Extension for Isochronous Communications" bearing the date Aug. 14, 1992 is a paper sent to National Semiconductor Corporation from Condor Systems, Inc. of San Jose, California on Aug. 18, 1992.

"IBM's Multimedia Venture: Opportunity for its Hardware?", vol. 38, No. 1930, p. 1, Sep. 21, 1992.

"DP839XX Isochronous Time Slot Exchanger (IsoTSX™)", Revision 0.8, bearing the date Oct. 29, 1992 and DP839XX Isochronous Ethernet Physical Layer isoPHY™ Revision 1.1, bearing the date Oct., 1992, were disclosed to International Business Machines.

A disclosure of a communication system was presented at the IEEE 802.9 Standards Meeting on Nov. 8–12, 1992. The pages entitled "Multi–Media Applications are Ready".

"National Proposes Isochronous Ethernet", *Electronic News*, vol. 38, No. 1940, p. 19, Nov. 30, 1992.

IEEE 802.9 Draft Standard Integrated Services (IS) LAN Interface at the MAC and PHY Layers, Institute of Electrical and Electronics, Nov., 1992.

"DP839XX Isochronous Ethernet Physical Layer Iso-PHY™," Revision 2.1, bearing the date Dec., 1992 and DP839XX Isochronous Time Slot Exchanger (isoTSX), Revision 1.0, bearing the date Dec. 13, 1992, were disclosed to IBM and Ericsson.

"DP839XX Isochronous Ethernet Physical Layer isoPhy™" Revision 3.0, bearing the date Dec., 1992 and Isochronous Time Slot Exchanger (IsoTSX™) Workbook, Revision 1.2, bearing the date Feb. 16, 1993 was disclosed to Luxcom, Inc. of Fremont, California.

DP8390 Network Interface Controller: An Introductory Guide, Local Area Network Databook, National Semiconductor Corporation, pp. 1–206 to 1–213, 1992 Edition.

DP83932B Systems–Oriented Network Interface Controller, Local Area Network Databook, National Semiconductor Corporation, pp. 1–288 to 1–383, 1992 Edition.

DP83950 Repeater Interface Controller, Local Area Network Databook, National Semiconductor Corporation, pp. 3—3 to 3–73, 1992 Edition.

DP83950EB at IEEE 802.3, Multi–Port Repeater Evaluation Kit, Local Area Network Databook, National Semiconductor Corporation, pp. 75–87, 1992 Edition.

American National Standard for Information System—document X3.139–1987.

"Scheme for Fast Ethernet Proposed," by Loring Wirbel, appears to be a newspaper article. At present, the date of this article is unknown, but it is currently believed to be prior to Mar., 1993.

"Local Area Network Databook" published by National Semiconductor, pp. 1–3 to 1–9, 1–242 to 1–248, 5–3 to 5–7.

"Token–Ring Network Architecture Reference," pp. 5–1 through 5–28 and pp. 5–10 and 5–17.

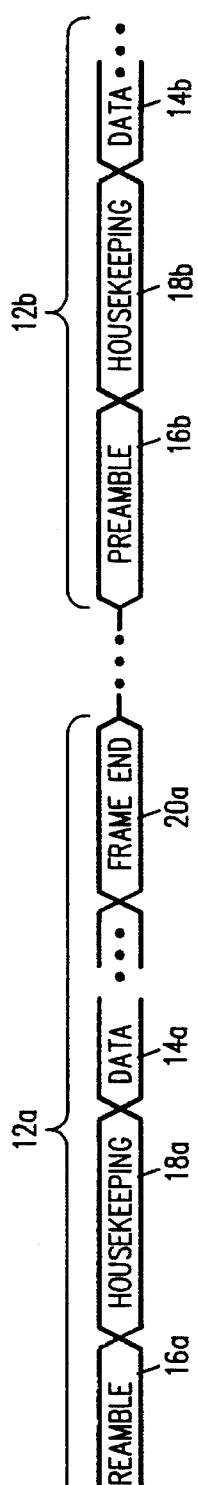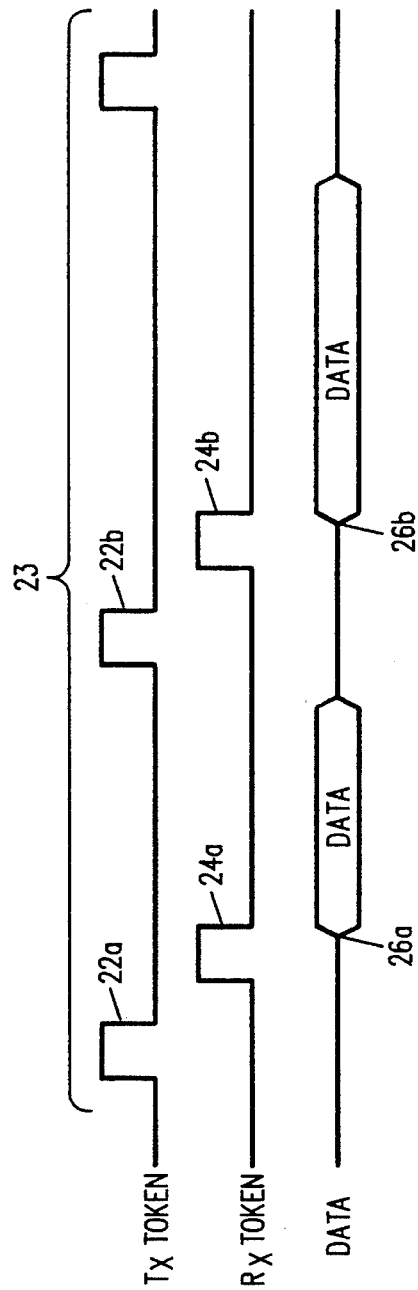
FIG. 1A
FIG. 1B
FIG. 1C

TIME SLOT EXCHANGER MECHANISM IN A NETWORK FOR DATA COMMUNICATION HAVING ISOCHRONOUS CAPABILITY

This is a continuation of co-pending application Ser. No. 08/146,337 filed on Nov. 1, 1993, abandoned, which is a continuation-in-part of application Ser. No. 07/969,916, filed on Nov. 2, 1992, abandoned, incorporated herein by reference.

The present invention relates to communication between stations or between two high bandwidth buses in a data communication system, such as a local area network or wide area network, and in particular to a network for transferring isochronous data with a transfer port, a hub cascade port and/or a frame synchronizing signal.

BACKGROUND OF THE INVENTION

In general terms, isochronous data is data which is non-packetized and of indeterminate, potentially continuous duration. Increasing availability of multi-media computers and work stations has contributed to an increase in interest in the transfer of data from isochronous data sources and sinks. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets $12a$, $12b$ which can be either constant-sized or variable-sized. Each packet includes a field of data $14a$, $14b$ which may be preceded and/or followed by non-data information such as preamble information $16a$, $16b$ housekeeping information such as data source information, data destination information, and the like $18a$, $18b$ and a frame end marker $20a$. As seen in FIG. 1A, because the fields provided for data $14a$, $14b$ are not substantially continuous, the packetized scheme of FIG. 1A is not isochronous but "bursty" in nature. An example of packetized data transfer is the commonly-used ethernet system. Standard ethernet systems are described in IEEE Standard 802.3. One implementation of which, known as 10 Base T, is described in the draft nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token $22a$ which is received $24a$ by a second station whereupon the second station may begin transmission of data $26a$. After a period of data transmission, the second station transmits the token $22b$ which is received by a third station $24b$ that can then begin its own transmission of data $26b$. As seen in FIG. 1B, because data transmission is synchronized with the occurrence of an event (the arrival of a token), the token ring system is not an isochronous data transfer system. One commonly used token ring Network is described in IEEE standard 802.5.

In contrast, FIG. 1C schematically depicts isochronous data transfer. In isochronous data transfer, the data transfer or connection is initiated, such as by initiating a telephone conversation or beginning a video camera transmission 30. After the connection is initiated, transmission of the data, possibly accompanied by transmission of housekeeping information (such as destinations, audio or video timing, and the like) is provided substantially continuously for an indeterminate period, such as until termination of the connection 32. Although it may be that not every bit transferred represents a data bit (since "housekeeping" bits may be also transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4, dated Mar. 25, 1991.

Previous attempts to accommodate isochronous data on a data network have resulted in characteristics which are disadvantageous for at least some applications. In some previous isochronous devices, the bandwidth available for accommodating a given isochronous source or sink was at least partially dependent on the demand on the network (i.e. on the total amount of data from and to sources and sinks transmitting and receiving on the network). In this type of system, performance of an isochronous source or sink could perceptibly degrade as additional sources or sinks were added to the network, such as by increasing data transfer delay. Preferably, both isochronous and non-isochronous bandwidth is provided, with the isochronous bandwidth being fixed and insensitive to non-isochronous demand and the non-isochronous bandwidth being fixed and insensitive to isochronous demand.

Many types of isochronous data transfer systems fail to provide for inter-operability with data derived from non-isochronous sources or sinks. In this type of system a given link is unable to transfer data from both an isochronous source/sink and a non-isochronous source/sink in a concurrent fashion (i.e. both within a time frame sufficiently short that the transfer is effectively simultaneous such that the ability of data sinks to process the data and the user's perception of the data are not substantially impacted). In these systems, it is infeasible to provide a single node which is coupled to both isochronous and non-isochronous source/ sinks (such as a multimedia PC having ethernet capabilities and a video camera).

Some previous isochronous systems provide little or no compatibility with previous networks so that extensive replacement of hardware or software becomes necessary. For example, in some schemes, it is necessary to replace the physical medium such as twisted pair media, or if existing in-place physical media are used, the performance is degraded, such as by a decrease in bandwidth for the type of communication formerly carried by the existing media.

Some isochronous systems require installation of new Media Access Controllers (MAC) or provision of new application software (such as local area network software). Some previous isochronous systems introduce an undesirable degree of delay or "jitter" (data discontinuities). Some types of isochronous systems are inflexible in the amount of bandwidth provided for isochronous data such that if the data rate of an isochronous source or sink is not precisely matched to the available bandwidth, the bandwidth will be either overwhelmed or substantially under-utilized by the isochronous traffic.

SUMMARY OF THE INVENTION

The present invention provides for communication of data to and from isochronous data sources and sinks so that the bandwidth available to an isochronous source/sink is independent of changes in isochronous demand on the network. Of the total bandwidth used for communication over the network links or physical media, at least a portion of the total bandwidth is dedicated to isochronous traffic. Preferably the bandwidth available for isochronous traffic can be selected or allocated with a predetermined granularity, e.g. so that the quality of transmission service desired for a given isochronous source or sink can be selected and the selected bandwidth can be sustained throughout the isochronous communication or connection. Preferably, a portion of bandwidth on the link is also dedicated to convey data to and from non-isochronous sources and sinks, as well as to permit conveying housekeeping information (such as information relating to data sources and destinations) and status and control maintenance information.

Preferably, the data communications system is implemented as a star-topology network with data sources transmitting to a central hub which, in turn, transmits the data to data sinks. Although, for convenience, much of the following discussion is in terms of hubs and nodes, aspects of the present invention can be implemented in topologies other than hub-and-node topologies (e.g., ring topologies, and tree topologies), as will be apparent to those of skill in the art. Descriptions of this circuitry in the following could be implemented, e.g., on a PBX adapter card for a personal computer. Several star-topology systems can be connected by providing inter-connection of the hubs, for example, in a ring structure (FIG. 3A). The system could also be arranged in a tree structure where one hub 44d is connected to others (44e, 44f) as depicted, e.g., in FIG. 3B. The multiplexed data from the node which arrives at the hub is de-multiplexed to separate the isochronous-source data, the non-isochronous-source data and the D channel and M channel information. The non-isochronous-source data can be provided to hub circuitry specialized for handling the non-isochronous data stream. Preferably, circuitry in the hub will convert the separated non-isochronous data stream into a form substantially similar to the form the data stream would have after arrival over a previously available non-isochronous network. For example, where non-isochronous data is sourced from an ethernet MAC, the hub will convert the separated non-isochronous data to a form such that it can be properly handled by standard ethernet hub repeater circuitry.

The separated isochronous data is conveyed to locations where it can be transmitted to the destination nodes of the network. The separated isochronous data is placed on a high bandwidth hub bus, with bandwidth capable of transmitting the collective isochronous data streams arriving from all nodes connected to the hub. The data arriving from the nodes can be placed onto the high bandwidth bus by e.g. a time slot interchange (TSI) function. One type of time slot interchange is described in *FDDI-II Hybrid Multiplexer*, Revision 2.4, dated Mar. 25, 1991. Preferably, the isochronous data is placed onto the high bandwidth bus and retrieved from the high bandwidth bus (for transmission back to the destination nodes) according to switching tables programmed in accordance with source/destination data transmitted over the D channel. In this way, the hub has sufficient intelligence to set up and maintain isochronous communication sessions or connections which may be requested on the D channel.

According to an embodiment of the present invention, the time slot interchange (TSI) function is implemented by making use of a set of three ping pong buffers. By controlling of the timing of the system, a third buffer exchanges data onto the TSI bus while a first buffer begins receiving data from one or more nodes. A second buffer serves as a holding buffer to account for skew between the two entries exchanging data. Upon completion of the data transfer, the second buffer is then designated as the output buffer. The third buffer is filled with incoming data and the first buffer holds the previously received data to account for the skew.

According to another embodiment of the present invention, a triple pointer scheme may be used in place of the three ping pong buffers. The pointer points to the buffer location to be used for incoming, outgoing and data temporarily held to correct for skew. Logic in the switching system detects the receipt of a frame start delimiter marking the beginning of a new data cycle. The logic then aligns the pointers with the appropriate buffer location.

Further features and advantages of the present invention will be described in greater detail below.

BRIEF DESCRIPTION OF THE DRAWINGS

FIGS. 1A, 1B and 1C of the timing of a packet transmission system, a token ring transmission system, and an isochronous transmission system respectively.

DETAILED DESCRIPTION OF THE PREFERRED EMBODIMENT

Figure 2:
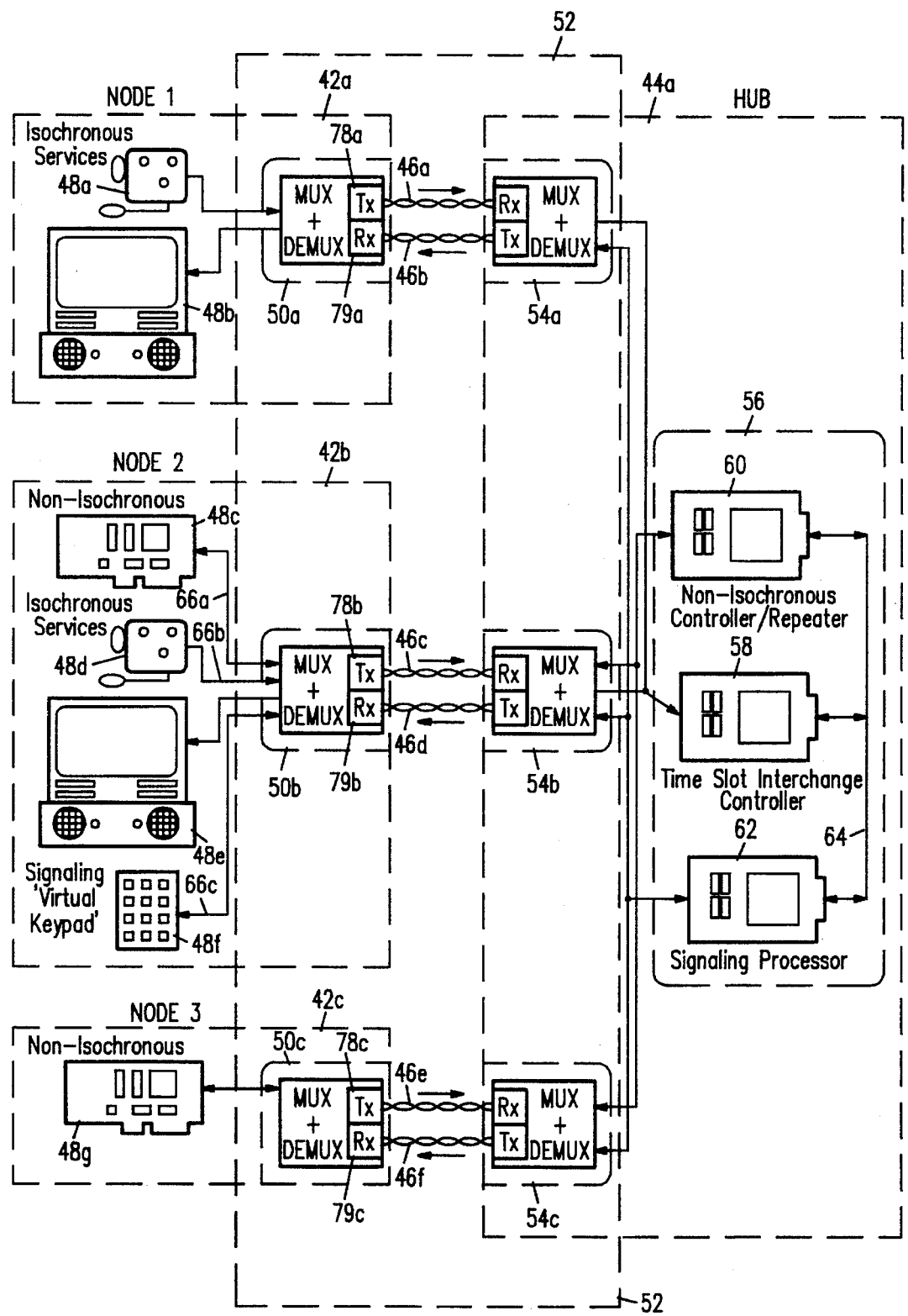
FIG. 2 is a schematic block diagram showing three nodes connecting to a hub card according to one embodiment of the present invention.

According to an embodiment of the invention as depicted in FIG. 2, a data communication system for isochronous data can be configured in a star-topology with a plurality of nodes 42a, 42b, 42c, each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e using transmitters 78a, 78b, 78c and receipt of signals from the physical media 46b, 46d, 46f using receivers 79a, 79b, 79c and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. In one embodiment of the invention, the network is able to operate properly even when connected to one or more nodes which are incapable of communicating using the time-division-multiplexed frame structure described below. For example, the hub 44a could be connected to one or more nodes which contain only previously-available circuitry such as 10 Base T. In this embodiment of the invention, the hub is able to detect whether a particular node is capable of time-division-multiplexed frame structure communication as described below. If the node does not have this capability, the hub will fall back to, e.g., a 10 Base T compliant communication mode. In this way, a network according to the present invention can operate in a mixed environment, having some nodes which operate using the time-division-multiplexed frame structure described below and other nodes which operate according to previous protocols. This system of automatic detection and fall back to a compliant communication mode is described in greater detail in commonly-assigned application Ser. No. 07/971,018, (Attorney Docket No. 8332-319/NS-2026), titled "NETWORK LINK ENDPOINT CAPABILITY DETECTION" filed on Nov. 2, 1992, abandoned.

In general terms, and in general accord with the International Standards Organization (ISO) network reference mode, the physical layer of the network is the circuitry between the media access controllers and the media (in the nodes) and between the repeater circuitry (if any) and the media (in any hubs). The physical layer 52 of the network system depicted in FIG. 2 has portions which include the physical media 46a–46f and physical layer devices such as the node data receivers and converters 50a, 50b, 50c and the hub components 54a, 54b, and 54c. The physical layer can include devices for providing, e.g., transceivers for 10 Base T cable, data multiplexing, phase locked loop circuitry, FIFOs or other circuitry for cable length adjustment, smoothing, squelch and the like.

Figure 3A:
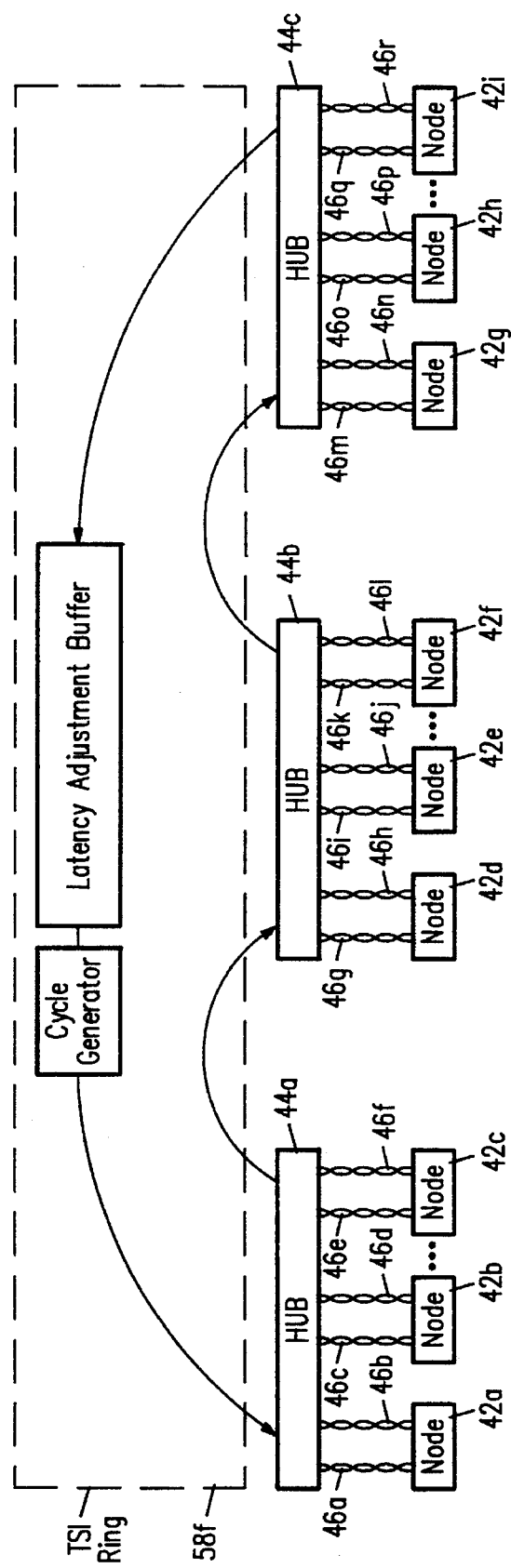
FIG. 3A is a schematic block diagram showing a number of hubs connected together using a ring structure.
Figure 3B:
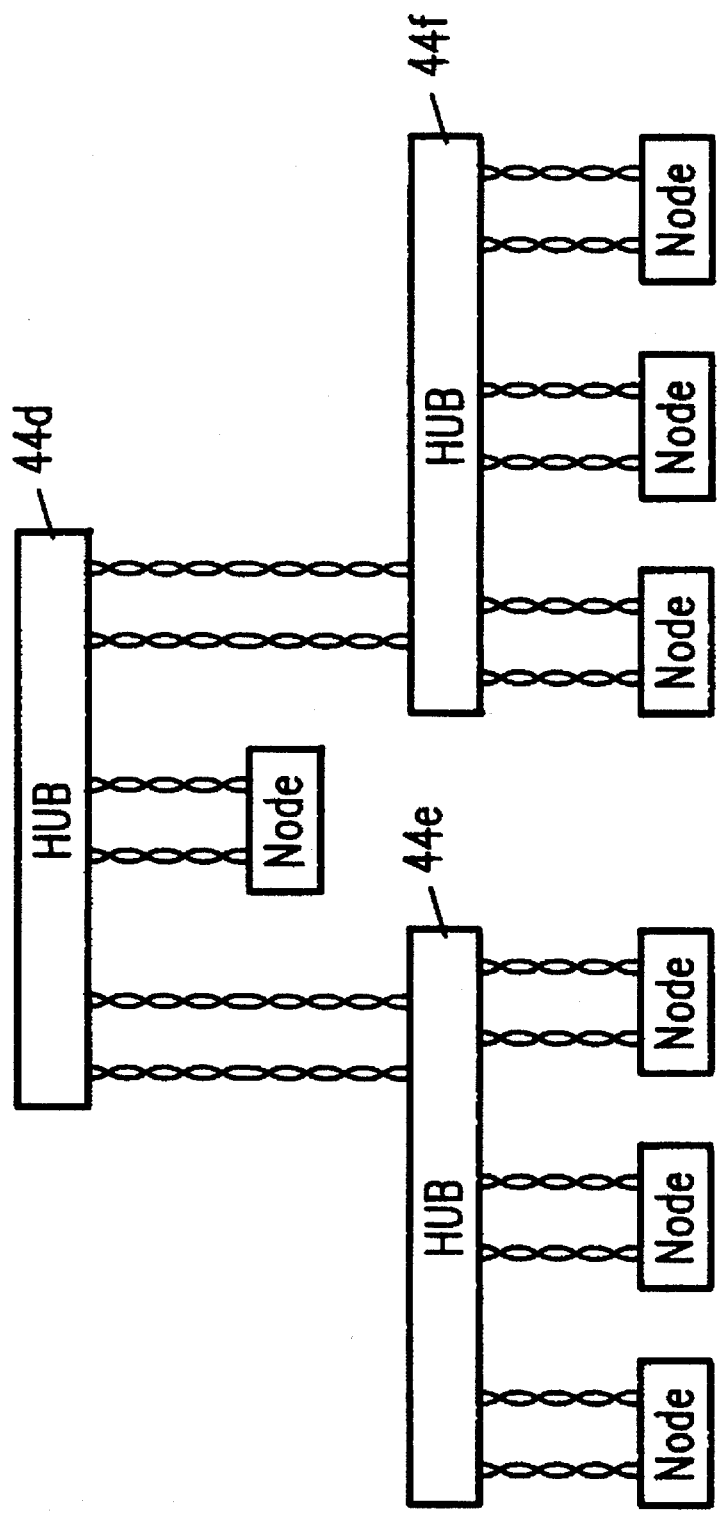
FIG. 3B is a block diagram showing a number of hubs connected together using a tree structure.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus so that it can be transported to destination nodes, e.g., on other TSI controllers in the same hub or in other hubs (as depicted in FIGS. 3A and 3B) or locally looped back to one of its attached nodes and retrieved by hub circuitry 54a, 54b, 54c for transmission to one or more of the various destination nodes 42a, 42b, 42c. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes ethernet data, the hub circuitry 60 can be a standard ethernet repeater processor. In this way, the present invention can be at least partially backwards-compatible with previous ethernet hub systems. The D channel and M channel information is provided to a signaling processor 62 which performs various maintenance and control functions such as identifying and alerting users of error conditions, and setting up requested connections, i.e. source/destination paths e.g. by communicating with the isochronous and non-isochronous controllers 58, 60, e.g. over data path 64. The isochronous controller 58 can be, e.g., a time slot exchanger such as an isochronous switching device, e.g., of the type described in greater detail below. The non-isochronous controller 60 can be, e.g., an ethernet repeater.

A number of star-topology systems can be interconnected, e.g., by connecting hubs 44a, 44b, 44c to one another in a ring structure as depicted in FIG. 3A wherein each of these hubs have nodes attached in a star topology or by connecting hubs 44d, 44e, 44f in a tree structure as depicted in FIG. 3B wherein 44d has 44e and 44f connected to it in the star topology. In the configuration depicted in FIG. 3A, the hubs 44a, 44b, and 44c are connected in a ring-topology with first hub 44a sending data to the second hub 44b, the second hub 44b sending data to the third hub 44c, the third hub sending data back to the first hub 44a via a ring latency adjustment and cycle generator circuitry. Preferably the data is sent in the same form as output onto the high bandwidth hub bus by the time slot interchange controller 58 and thus the inter-hub connections are referred to as a Time Slot Interchange (TSI) ring. In one embodiment, an FDDI-II system can be used as a backbone to carry the TSI ring data to other hubs as illustrated by 58f in FIG. 3A.

A description of the operation and sub-components of the depicted embodiment of the present invention will be provided by describing the transfer of data from isochronous source 48d and non-isochronous source 48c to isochronous sink 48b and non-isochronous sink 48g.

Data sent from isochronous device 48d is a continuous stream of digitized data from, e.g., a video camera. In the present example, the data from isochronous device 48d will be taken as having a data rate equal to the American "T1" standard of 1.544 Mbps. Data output from the ethernet MAC 48c is provided at the standard 10 Base T ethernet rate of 10 Mb/sec. D channel information is provided from a D channel data stream source, preferably contained in a MAC or other circuitry in the system, or, for example, from the virtual key pad 48f at a variable data rate, such as a rate not exceeding about 64 Kbps. These incoming data streams are provided over lines 66a, 66b, 66c to node circuitry 50b' (FIG. 4), which is part of the node data receiver and converter 50b (FIG. 2). The incoming data from the various sources is provided to a multiplexer 70 (FIG. 4) which performs time-division multiplexing on a four-bit basis. The pattern for the time-division multiplexing is a repeating series of frames or templates. In this embodiment of the invention, the frames are repeated every 125 microseconds.

Table IA depicts the manner in which the various data streams, and additional data and control bytes are time-division multiplexed. Each symbol in Table IA represents four bits of data so that every group of two symbols represents one 8-bit byte of data. In Table IA, E represents four bits of data from the non-isochronous ethernet stream 66a, B designates four bits of data from the isochronous stream 66b, D represents four bits of data from the signaling or D channel stream 66c, and M represents four bits of M channel data 66d which preferably is provided by circuitry 50b. In addition, certain byte-length patterns are provided. JK represents a frame synchronization pattern and EM (the first two bytes of block three in Table I) represents an ethernet "pad" followed by a maintenance nibble as described below. As seen in Table I, each frame contains 256 bytes which can be considered in thirty-two groups of eight bytes each, or four blocks of sixty-four bytes each. The frame structure is described more thoroughly in commonly-assigned application Ser. No. 7/969,911 (Attorney File No. 8332-315/NS-2024), titled "NETWORK FOR TRANSMITTING ISOCHRONOUS-SOURCE DATA WITH A FRAME STRUCTURE" filed on Nov. 2, 1992 and incorporated herein by reference.

The depicted frame structure provides an allocation of bandwidth such that the data rate for the non-isochronous data are compatible with, e.g., 10 Base T ethernet data rates. Other types of frame structures could be used in connection with other isochronous and/or non-isochronous data sources and sinks such as token ring non-isochronous sources and sinks, in which case a different frame structure can be used to provide an allocation of bandwidth suited for the particular purpose.

Figure 4:
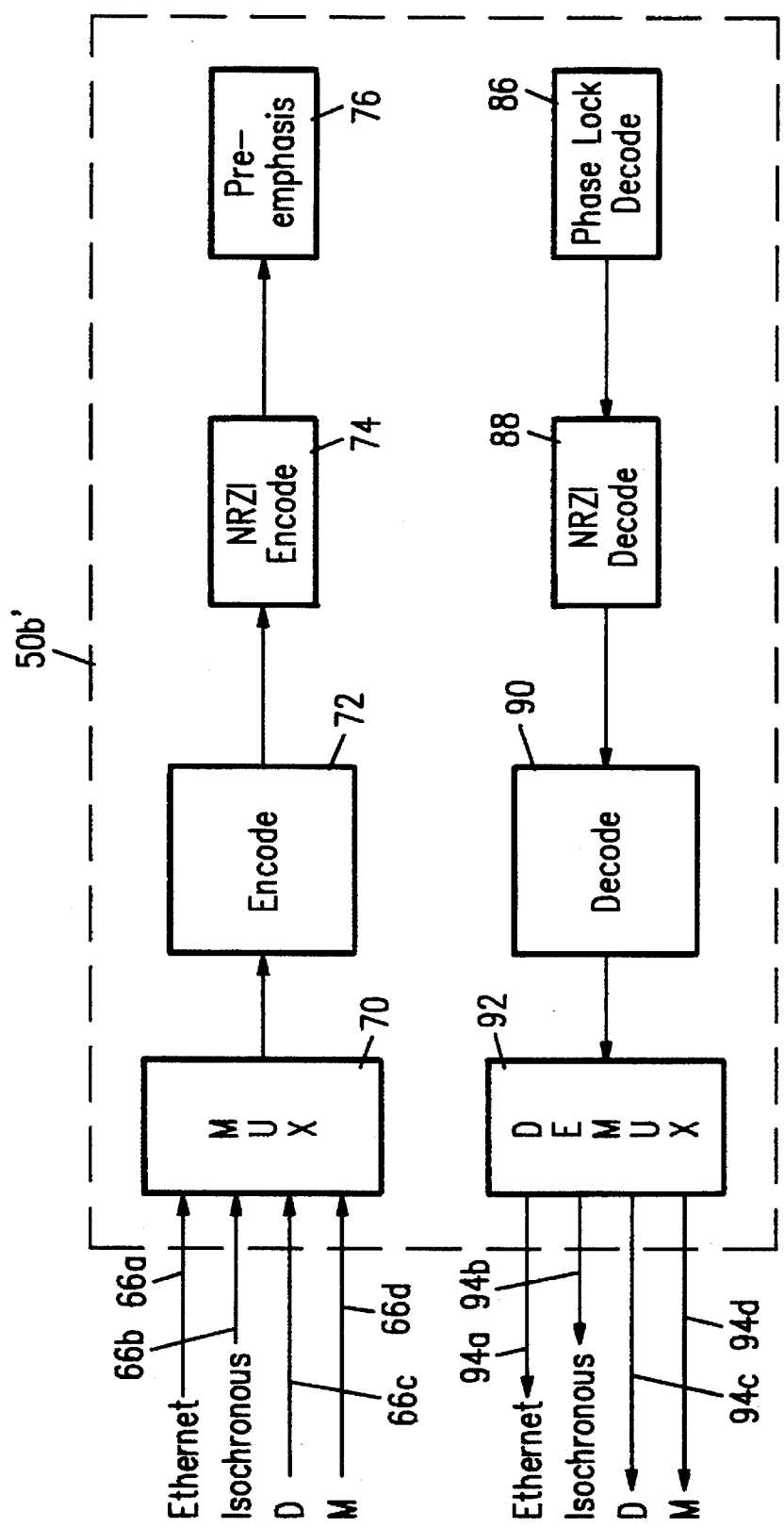
FIG. 4. is a schematic block diagram of circuitry for multiplexing and preparing data for transmission over the media and for receiving information from the media and demultiplexing the data.

As shown in FIG. 4, the time-multiplexed data is then encoded by an encoder 72. In the depicted embodiment, the encoder performs four/five encoding. One particular form of four/five encoding conforming partially to the ANSI X3T9.5 standard, is depicted in Table II. The five bit code symbols of the particular four/five implementation have been chosen so as to maintain the AC balance of the physical medium, and to minimize the frequency spectrum of wave forms as they are transmitted along the physical medium. This eases the task of the data decoder, which is typically a phase lock loop device, in recovering the data and the transmission clock. These patterns, when properly combined, have a maximum of three bit times with no transition. With a bit rate of 48.8 ns, the minimum transition rate is 3.41 MHz or 146.5 ns between transitions.

The encoding scheme depicted in Table II is described in greater detail in commonly-assigned application Ser. No. 07/970,329 (Attorney File No. 8332-316/NS2022), titled "FRAME-BASED TRANSMISSION OF DATA", filed on Nov. 2, 1992 U.S. Pat. No. 5,361,261 and incorporated herein by reference. A standard ethernet system uses the absence/presence of a carrier signal to indicate the start of a packet. In the present system, the frames are transmitted continuously, one after another, and there is not a significant period during which there is a lack of signal on the physical media. Thus, a "no ethernet carrier" symbol (Table II) is used to denote lack of an ethernet carrier in the output from the ethernet MAC. According to the present frame structure, data is expected to appear in an integral number of 4-bit nibbles. This may not be the case if an ethernet packet suffers from the addition of "dribble bits" which do not make up an integral number of nibbles. In this case, a code symbol "unaligned data" is transmitted.

The results of the four/five encoding is then further encoded by encoder 74 (FIG. 4) using a non-return to zero, inverted (NRZI) scheme. The NRZI encoder modifies the bit stream by inverting the output whenever a logic 1 is transmitted. Logic 0 produces no change in state. The four/five-NRZI encoding is particularly useful in networks in which a non-isochronous source is a 10 Base T ethernet source. This is because the four/five-NRZI encoding provides for transmission at a signaling rate such that the data rate for the non-isochronous portion of the data is substantially compatible with the data rates provided and expected by the ethernet MAC. In typical ethernet systems, a data rate of 10 Mb/sec is provided. In standard ethernet systems, the data provided at this rate is encoded using a differential manchester scheme using two transition times to transfer one bit of data. On average, this scheme provides one clock bit per every bit of data. Thus the standard ethernet data rate of 10 Mbit/sec, after manchester encoding, results in a signalling rate of 20 Mbit/sec.

Comparing the standard ethernet signalling rate and data rate to that provided by the frame structure of Table I and encoding of Table II, it is seen that in the present scheme, a frame of data contains 313 "E" symbols or 1252 E bits. By transmitting frames at a rate of one frame every 125 microseconds, the present scheme has a capacity for transmitting 10.016 Mbits/sec of ethernet-sourced data interspersed with 6144 Kbits/sec of isochronous data. Thus by using the four/five-NRZI encoding, the data rate and signaling rate is within two and one-half percent of the signaling and data rate used by 10 Base T, allowing both isochronous traffic and ethernet traffic to travel over existing physical media 46 without seriously degrading the data rate of the ethernet traffic, compared to previous standard ethernet systems. Moreover, provision of substantially standard ethernet data rates contributes to the ability to implement the present invention without the necessity for replacing in-place MACs or repeater circuitry. The ability to convey data frames substantially at the signaling rate used by previously-available systems, such as standard ethernet, contributes to the ability to implement the present invention without the necessity to replace in-place physical media, such as twisted pair media.

Although the four/five-NRZI encoding is particularly useful in connection with an ethernet non-isochronous source, other types of encoding or decoding can also be used in the present system, including, e.g., a scheme encoding 8 bits into 10 bits. Furthermore, additional types of encoding or decoding can be provided tailored to the requirements of other non-isochronous sources/sinks, such as token ring non-isochronous sources and sinks. In connection with the present invention, the more important aspect of encoding is not as much the particular encoding scheme used as selection of an efficient coding scheme and particularly a scheme having sufficient efficiency that the bandwidths of both the incoming non-isochronous data 66a and the incoming isochronous data 66b (FIG. 2) can be accommodated on the physical media 46 (FIG. 2) without seriously degrading bandwidth formerly available for the non-isochronous data. The four/five encoding scheme is more efficient than differential manchester encoding scheme, in this regard, since it provides four bits of data for every five potential transitions so, on average, that one clock bit is provided for every four bits of data (as opposed to one clock bit for every data bit in differential manchester encoding). Thus, whereas in previous standard ethernet systems, the differential manchester coded data took up substantially the entire bandwidth of the twisted pair media, which has a maximum effective signalling rate of about 20 Mb/sec, the four/five-NRZI encoding permits physical media having the same bandwidth to accommodate both the 10 Mbit/sec ethernet data stream and a 6144 Kbit/sec isochronous stream, as well as a 64 Kbit/sec D channel, a 96 Kbit/sec maintenance channel, and 64 Kb/sec for the frame synchronization pattern. Additionally, 80 Kb/s (64 Kb/s+ 16 Kb/s) are available but undefined. These characteristics are summarized in Table III.

As an example, it is assumed that the data rate output from the isochronous source 48d is 1.544 Mb/sec. However, the frame structure noted above provides an isochronous bandwidth capability of 6.144 Mb/sec. Thus, the single isochronous source 48b in the present example can be entirely accommodated using only 48 of the 192 "B" symbols per frame (i.e. 24 bytes per frame or 192 bits per frame). This leaves 72 "B" symbols per frame unutilized by source 48d. Thus, it would be possible to use the isochronous channel of this embodiment of the invention to carry isochronous data from four isochronous sources, each outputting data at a rate of 1.544 Mb/sec. It would also be possible to use the described embodiment to carry the output from three isochronous sources, each outputting data at a rate of 2.048 Mb/sec (i.e. the CEPT European standard). A basic rate ISDN Channel could be supported by using three 64 Kb/s slots within the isochronous channel. It would also be possible to transmit data from up to ninety-six isochronous sources, each outputting data at a rate of 64 Kb/s. Thus, it is possible to transfer data from a single isochronous source outputting at a rate of 6.144 Mb/s or the isochronous bandwidth available may be allocated with a granularity of 64 Kb/s, i.e. it may be split into multiples of 64 Kb/s.

As depicted in FIG. 4, the output from the NRZI encoding devices is sent to pre-emphasis circuitry 76. The pre-emphasis circuitry compensates the signal transmitted onto the physical medium to reduce the jitter. The pre-emphasis stage is optimized for the frequency spectrum employed by the present system. The data output by the pre-emphasis circuitry 76 is sent to a transmitter or driver 78b (FIG. 2) and the signal is transmitted over the physical medium 46c (FIG. 2). The physical medium 46c can be any of a number of media types including twisted pair, coaxial or fiber optic cable. In one embodiment, the network is configured so that the desired data rates can be achieved within the bandwidth inherent in twisted pair media and it is anticipated that at least initial use of the disclosed embodiments will make frequent use of twisted pair as media in order to take advantage of twisted pair networks already in-place. Although a number of configurations for the physical media are possible, certain features of the network of the present invention are preferably configured to accommodate the characteristics (including the delay characteristics) of twisted pair wiring having a maximum length of approximately one hundred meters.

Figure 5:
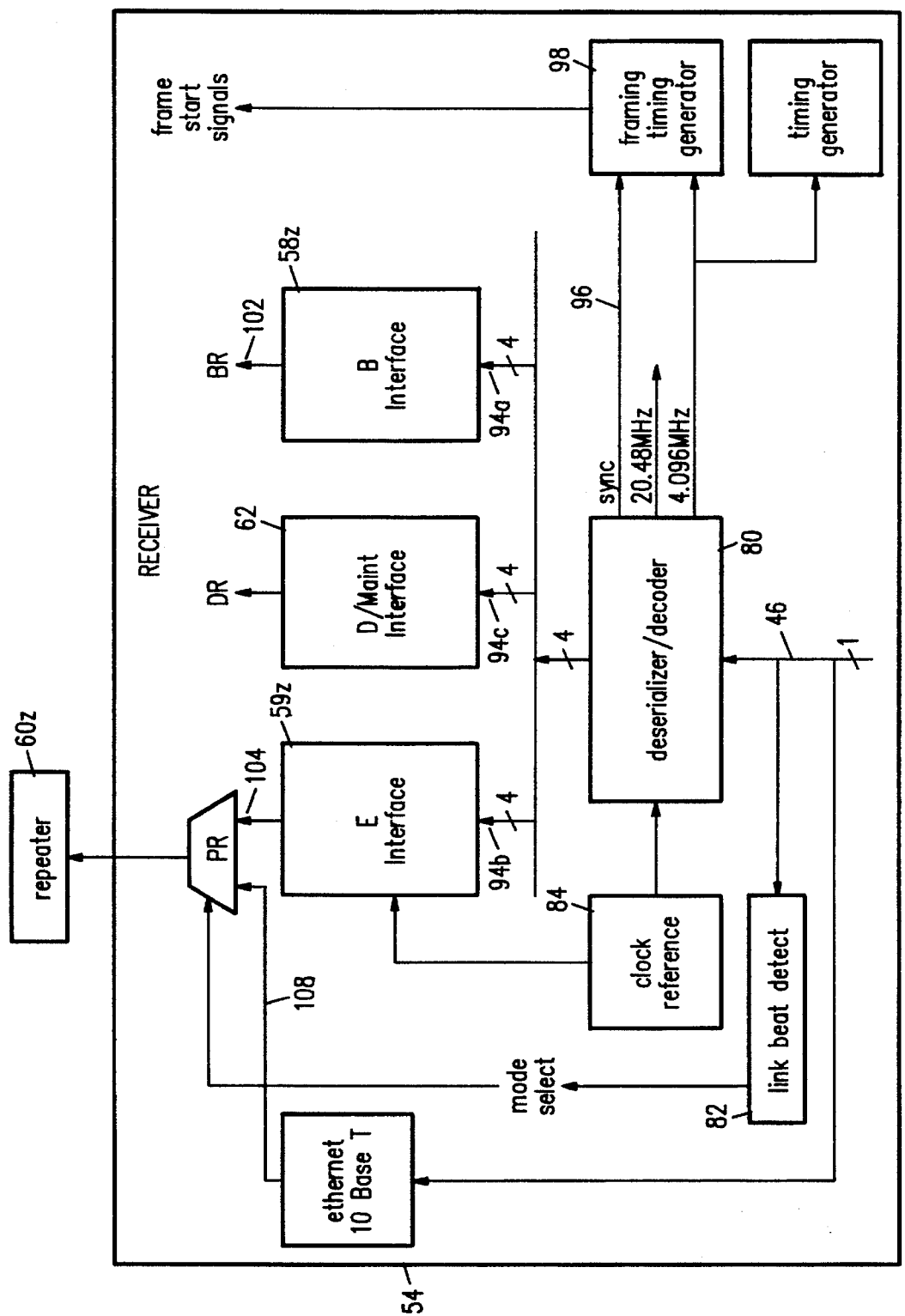
FIG. 5. is a schematic block diagram of receiver circuitry according to an embodiment of the present invention.

As depicted in FIG. 2, the data sent over the physical media 46a is received in the hub 44a. The hub contains a plurality of circuit devices 54a, 54b, 54c, each one coupled to one of the nodes 42a, 42b, 42c by the physical media 46a–46f. As depicted in FIG. 5, the data transmitted over the physical media 46 arrives serially at a de-serializer/decoder 80. Link detect circuitry 82 also receives the data from the physical media 46 for detection of the mode in which the node is operating (e.g., 10 Base T, isochronous-ethernet or isochronous) and outputting a mode select signal, as described more fully in commonly-assigned application Ser. No. 07/971,018 (Attorney File No. 8332-319/NS-2026, abandoned, titled "NETWORK LINK ENDPOINT CAPABILITY DETECTION". The de-serializer/decoder 80 receives a reference clock signal 84. The de-serializer/decoder includes circuitry which is functionally an inverse of the multiplexing/encoding circuitry described above. Referring to FIG. 4, the deserializer/decoder includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the non-isochronous-sourced data 94b and signaling data, such as D channel 94c and M channel data 94d. The deserializer/decoder 80 also outputs a synchronization signal, derived from the JK frame synchronization symbols 96 for use by a framing timing generator 98.

Referring to FIGS. 2 and 5, both the non-isochronous-sourced data 104 and the isochronous-sourced data 102 are made available to the various hub circuitry 56 or components 54a, 54b, 54c as needed for transmission back to destination nodes. In one embodiment, the separated isochronous data 94a and non-isochronous data 94b are reconfigured by the respective interfaces 58z, 59z to provide isochronous output 102 and non-isochronous output 104 in a form suitable for processing so as to provide the data as needed for transmission to the destination nodes. In one embodiment, the non-isochronous data 94b is configured by the E interface 59z so that the output data 104 can be processed by a repeater device for provision to hub circuitry 54 and eventual transmission to destination nodes. As an alternative to using a repeater for the non-isochronous data, packet connections may be linked through media access control layer bridges. Preferably, the output data 104 is in a form such that it can be handled by repeater circuitry of types previously available. For example, when the non-isochronous data 94b is data which originated at the node 42b from an ethernet MAC, the output data 104 is in a form such that it can be handled by a standard ethernet hub repeater 60 such as a DP83950 "Repeater Interface Controller" (RIC) available from National Semiconductor Corporation, Santa Clara, Calif. This configuration provides the advantage that the present invention can be implemented without the necessity to replace all hub circuitry, in particular without the necessity for replacing hub repeater circuitry. In some embodiments, it may be desirable to provide the non-isochronous data 104 back to the circuitry 54 for return to the destination nodes without using previously-available repeater circuitry, such as in new network implementations where it does not matter whether the invention is implemented so as to be able to use previously-available repeater circuits.

Figure 6:
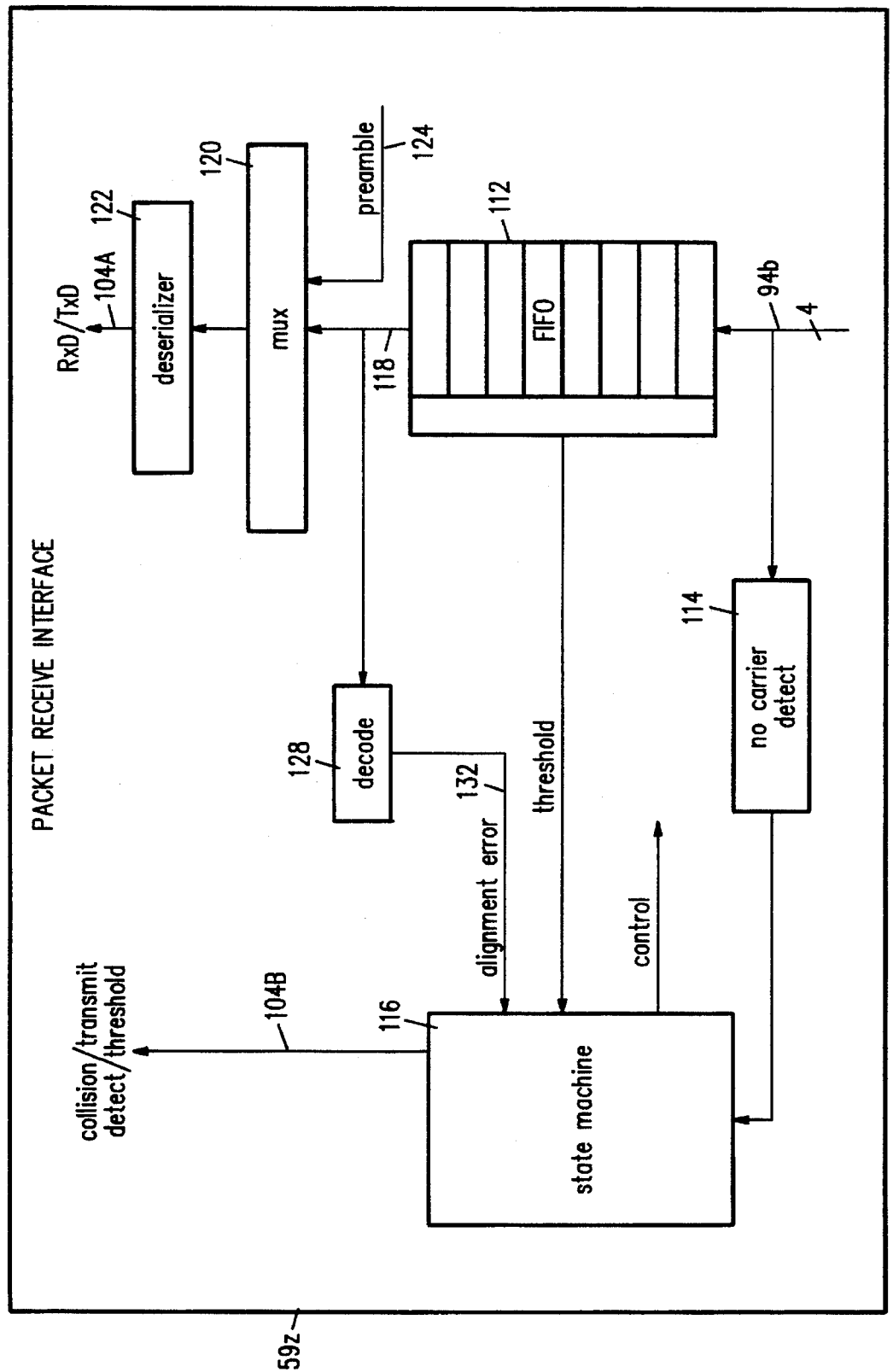
FIG. 6 is a block diagram depicting the packet receive interface, according to an embodiment of the present invention.

FIG. 6 depicts one implementation of an E interface 59z of a type which will receive the non-isochronous data 94b and provide outputs 104a, 104b of a type that can be processed by previously-available repeater circuitry 60z. The non-isochronous data is received in a first-in-first-out (FIFO) buffer 112 to smooth out data rates. Circuitry 114 detects "no carrier" symbols, provided to emulate ethernet data packets, which will be used by logic circuitry or state machine 116 to output carrier detect signals. The output 118 from the FIFO 112 is provided to a multiplexer 120 and a de-serializer 122 to produce data output 104a. The multiplexer 120 can receive a preamble stream 124 to provide the proper preamble bits in the output data 104a. Output 118 from the FIFO 112 is also provided to decode circuitry 128 to recognize alignment error symbols and output appropriate signals 132 to state machine 116. Operation and components of the receive interface 59z are described more thoroughly in application Ser. No. 07/970,329 (Attorney File No. 8332-

316/NS-2022) U.S. Pat. No. 5,361,261. For purposes of example, it will be assumed that data from isochronous-source 48*d* is transmitted in the first 24 bytes of each frame represented by the "B" symbols in block 0 of Table I (i.e. the first forty-eight "B" symbols in the frame structure).

Figure 7:
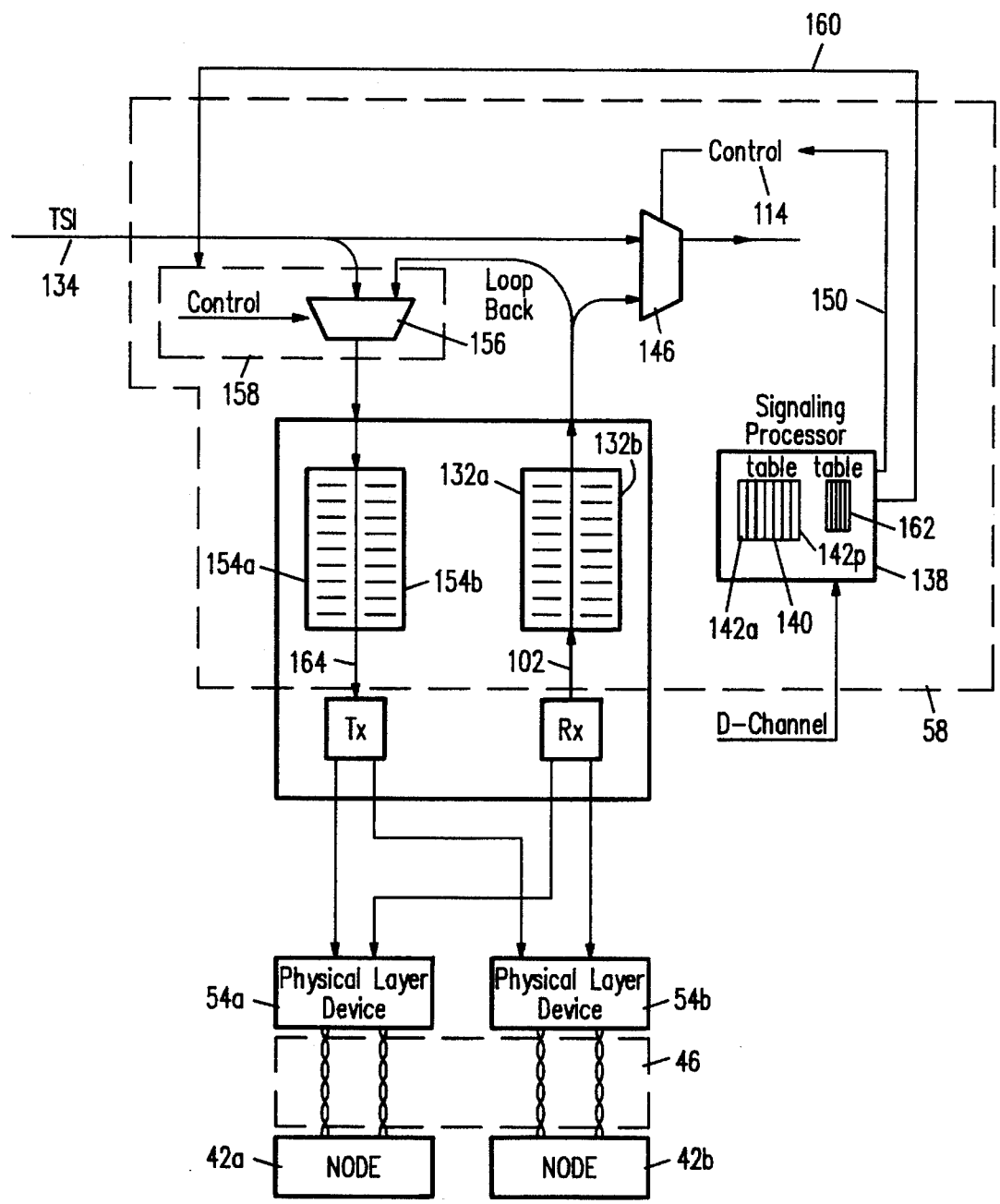
FIG. 7 is a schematic block diagram of a signaling processor in the hub and its connection to hub circuitry for receiving and buffering data for placement on a high bandwidth bus and connections to nodes.

FIG. 7 is a schematic diagram of a signalling processor in the hub and its connection to hub circuitry for receiving and buffering data onto a high bandwidth bus and connections to nodes. In the embodiment of FIG. 7, the separated isochronous data 102 is stored in one of two buffers 132*a*, 132*b*. The timing of storage in the buffers 132*a*, 132*b* is coordinated with the 125 microsecond frame transmission timing so that data 102 from a first frame will be stored in the first buffer 132*a* during a first period of 125 microseconds and, during the next 125 microsecond period, the isochronous data 102 from the next frame will be stored in the second buffer 132*b*. In one embodiment, the data can be stored in the buffer 132 in the same order it is received, such that the eight bits represented by the first two "B" symbols in Table IA is stored in the first storage location of buffer 132*a*, that corresponding to the second two "B" symbols in Table IA is stored in the second location of buffer 132*a* and so on. Since the frame structure depicted in Table IA contains 96 bytes of isochronous data per frame, each of the buffers 132*a*, 132*b* has the capacity to store 96 bytes of data per node supported. After isochronous data from a first frame is stored in buffer 32*a*, during the next 125 microsecond period (while the data from the next frame is being stored in the second buffer 132*b*) data which was stored in the first buffer 132*a* is transmitted onto a high bandwidth bus 134. The loading of the buffer 132 is dependent upon the number of nodes supported by the hub 44*a* (FIG. 2). Bus 134 has sufficient bandwidth to carry the isochronous data output from a plurality of nodes which are connected to the hub 44*a*. In an embodiment in which the hub 44*a* is connected to 16 nodes, the bandwidth of the bus 134 must be sufficient to receive 1,536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments of the invention could be provided with other bandwidths for the TSI bus 134. However, the 98304 Kb/sec bandwidth is particularly useful because it substantially matches the bandwidth employed in FDDI-II, 48E1 or 68T1 making it particularly easy to port the data on the TSI bus 134 to a TSI ring 58*f* (FIG. 3) in configurations where the TSI ring 58*f* is an FDDI-II system.

According to one embodiment, the data is conveyed from the buffer 132 onto the bus 134 in a time slot interchange fashion, and thus the bus 134 is referred to as a time slot interchange (TSI) bus.

As noted above, as data travels over the physical media 46, each 125 microsecond time period is divided into 512 equal time slots, each one of which is used to convey five bits of information (on average, conveying 4 bits of data and one timing bit). Thus, each 125 microsecond time frame on the physical media 46 contains 512 time slots, each of which has a duration of about 0.2441 microseconds. In contrast, the data carried on the TSI bus 134 is transmitted in 125 microsecond time frames divided into 1,536 time slots, usable for isochronous data each of which has a duration of about 0.08138 microseconds. Thus, during a 125 microsecond time frame in which the data from buffer 132*a* is being exchanged onto the TSI bus 134, it is necessary to control the timing of the output of data from the buffer 132*a* such that a given one of the bytes stored in 132*a* is passed to a latch for transmission on to the TSI bus 134 at the proper slot of the 1,536 time slots. Which of the time slots is "proper" depends on the use which is to be made of the data and, in particular, the connection established associated with the destinations for the data. The destinations for data, in the depicted embodiment, has been pre-established using the D channel information. The D channel signaling information is sent to and processed by a signaling processor 138. The D channel information which includes source and destination data is used to store values in a connection memory switch table 140. In one example, the connection switch table 140 contains 1536 locations, one for each one-way direction. The 1536 locations in the connection switch table contain bits to be used for control of the switching of the B slot data either to another node via an attached part or to the TSI bus.

In the example described above, it was assumed that the 24 bytes of data per 125 microsecond frame were conveyed in the first 24 B slots of the frame transmitted from the source 48*d* in FIG. 2. Thus, the data from the source 48*d* will be stored in the isochronous data buffer 132. In this example, the destination of the data is 48*b*. Thus, the 24 B slots of data will be transferred to data buffer 154*a* and then transmitted to 48*b* in its corresponding first 24 B slots.

The 24 B slots could have been destined for the TSI bus in which case the 24 B slots in 132 would have been switched onto the TSI bus. A bit of the contents of the switch table would have controlled line 150 to control the multiplexer. Assuming the first 10 time slots of the TSI bus do not receive the B data which is destined for a node attached to the isochronous switching device during the first TSI time slot, the multiplexer control 150 will be "0" and no data will be output from the buffer 132 onto bus 134. The multiplexer 146 will merely convey along the TSI bus 134 whatever data was already on the TSI bus in the first time slot. This continues until the 11th time slot of the TSI bus, at which time the B data destined for a node attached to another isochronous switching device or hub begins to be output onto the TSI bus. During each of the next 24 TSI bus time slots, the control signal for multiplexer 146 will be "1" and a byte of data stored in the appropriate data location of buffer 132 will be output through multiplexer 146 onto the bus 134. Which data location of the buffer 132 is "appropriate" is determined by the D channel packet for call set-up and can be indicated by a read pointer (e.g., contained in the switch table). Preferably, buffer 132 is a random access memory (RAM) and the read pointer will be determined according to the contents of the switch table location representing the TSI slot frame. After completion of conveying the 24 bytes onto the TSI bus, there will be no output from the buffer 132*a* to the TSI bus 34 during subsequent time slots of this TSI frame. In this way, time slots 11 through 35 for a frame on the TSI bus will be filled with data stored in the buffer 132*a*, i.e. the 24 bytes of data output by the isochronous source 48*d*. Since no other connection was set-up, the remaining time slot data (slot 36 through 1536) pass through the isochronous switching device.

FIG. 7 also depicts how the isochronous data is retrieved from the TSI bus 134 for transmission to a destination node. In one example, it is desired to retrieve the twenty-four bytes of data which are carried on the TSI bus during the time slots 11 through 35 of the frame transmitted on the TSI bus 134 and transmit these to isochronous sink 48*b*. Isochronous switching device circuitry 58 is provided for support of the node connections. In the present example, the data from the TSI ring is processed by circuitry 58 which is associated with node 1, i.e., the node which contains data sink 48*b*.

Data carried on the TSI bus will be loaded into one of the buffers 154a, 154b. The two buffers 154a, 154 b are controlled to provide timing similar to the timing of the buffers 132a, 132b described above. That is, during a first time frame, the first buffer 154a will be receiving data from the TSI ring while the second buffer 154 b is outputting data (which was stored during the previous time frame) for transmission onto the physical media 46 to the destination node 42a. During the next time frame, the roles of these buffers will be reversed such that data retrieved from the ring will be stored in buffer 154 b and the data stored in 154a during the previous frame will be output for ultimate transmission to the destination node 42a.

Retrieval from the TSI ring is achieved by a multiplexer 156 controlled by a control signal 158 output over line 160 from the signalling processor 138, relying on a connection switch table 162 in a fashion similar to that described for control of multiplexer 146. Control data is stored in an output table 162 according to destination information provided over the D channel to the signaling processor 138. In general, unless there is a local loopback of data, the TSI bus data is loaded into the buffer 154. In the present example, during the first ten slots of the TSI bus frame, data from the TSI ring 134 may or may not be stored in the buffer 154a (depending, e.g., on the absence or presence of a local loopback procedure for this data). During the next 24 TSI bus time slots, the control signal output from the signaling processor causes data from the TSI bus 134 to be stored into the buffer 154a. During the remainder of the TSI time frame, data may or may not be provided from the TSI bus 134 to the buffer 154a. In this way, time slots 11 through 35 from the TSI ring are stored in the buffer 154a. During the following time frame, (during which data from the next time frame may be stored in the buffer 154b), only the data from the buffer 154a is output over line 164 for transmission to one or more destination nodes attached to hub 44a and specifically node 42a, in this example.

Although in the example just described, data is output from the buffer 132a onto the TSI bus 134 in the same order it was received, this is not necessarily the case. For example, an embodiment of the invention could be configured such that the signaling processor 138 provides addresses (read and write pointers) to the buffer 132a to determine the order in which data stored in the buffer 132a is provided to the TSI ring 134. Similarly, it would be possible to use addresses output from the signaling processor 138 to control the locations in which data retrieved from the TSI bus 134 is provided to the attached nodes.

Circuitry 58 can also be provided with a local loopback capability. The local loopback capability permits circuitry 58 to transfer data directly from the receive buffer 132 to the transmit buffer 154 without first placing the data onto the TSI ring 134, thus freeing TSI bus bandwidth. This is the case, e.g., when data from a source attached to hub 44a is destined to another node attached to hub 44a. Local loopback capability is described more thoroughly in commonly-assigned application Ser. No. 07/969,910 (Attorney File No. 8332- 317/NS-2025,) titled "LOCAL LOOPBACK OF ISOCHRONOUS DATA IN A SWITCHING MECHANISM", filed on Nov. 2, 1992 and now abandoned. Local loopback capability is useful, for example, when both an isochronous source and an isochronous sink are connected to the same hub. For example, in the configuration depicted in FIG. 2, both the video camera isochronous source 48d on node 2 and the video monitor isochronous sink 48b on node 1 are connected with the same hub 44a. Local loopback can be used to provide data to the monitor 48b for displaying images received by the video camera 48d, substantially in "real time," but without placing the data on the TSI bus 134, thus allowing the bandwidth to be used by other connections.

Figure 8:
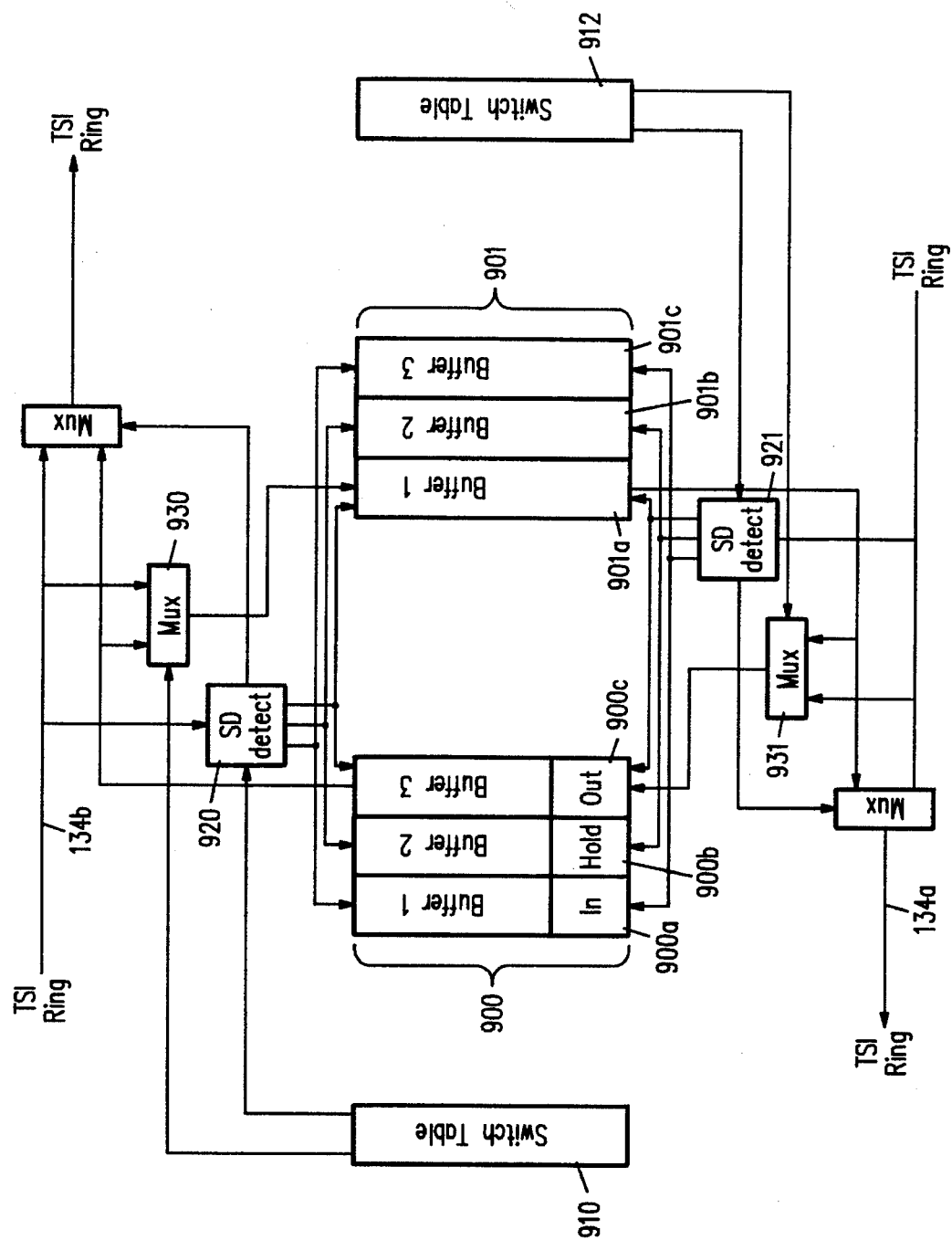
FIG. 8 is a schematic block diagram of an isochronous time slot data exchange switching mechanism according to an embodiment of the present invention.

FIG. 8 shows an embodiment of an isochronous switching device for exchanging information between two entities in a time slot interchange fashion. The switching mechanism of FIG. 8 may be used in place of the circuitry 58 of FIG. 7 described above. The switch of FIG. 8 may also be used for any two entities exchanging data in a time slot interchange manner, for example, two backbones, such as two TSI rings, a backbone and node, node to node, or any mixture of these. The isochronous switching device of FIG. 8 can thus accommodate two independently operating TSI rings 134a and 134b as shown.

In the circuit of FIG. 8, these TSI rings may be up to one cycle skewed from each other, by use of a connection memory having, for example, three ping pong buffers or one buffer with three pointers. The circuit of FIG. 8 includes two sets 900 and 901 of triple ping pong buffers, each set having enough storage for each direction of data transfer. Shown with the two sets of triple ping pong buffers 900 and 901 are switch tables 910 and 912 and cycle start delimeter and detection logic 920 and 921. Information in the switch tables 910 and 912 contain the buffer location of the data to be read out of the buffer, internal loopback control, and, external exchanging control as described in connection with FIG. 7. Multiplexers 930 and 931 may be used for internal loopback of the byte of data also as described previously. Switch tables 910 and 912 allow one to many slot switching. The contents of the switch table are provided by the connection allocation algorithm and passed to switch tables 910 and 912 via a microprocessor interface, for example in the manner described in connection with FIG. 7. The addressing of the switch table corresponds to the 1536 time slots on the TSI ring or port (node) interface logic.

Cycle start detection logic 920 and 921 detects the start delimeter, indicating the start of a new TSI cycle, which begins the addressing of the switch tables. Each address of the switch table corresponds to one time slot. The ping pong buffers change functions upon receiving the start delimeter. The three ping pong buffers correspond to incoming, skew, and outgoing data. If the two rings are perfectly in sync, only two buffers are used. For example, the node (aka port interface) is completely synchronized to the ring and thus really only requires two ping pong buffers. In this situation, buffers 900a and 900b, for example, simply toggle back and forth as the incoming and outgoing buffers. If the rings are not in sync the third buffer is used to account for the skew.

For purposes of explaining the operation of FIG. 8, a data transfer from TSI ring 134a to TSI ring 134b is described. For purposes of this example, buffer 900a is initially the incoming buffer, buffer 900b is the holding buffer, and buffer 900c is the outgoing buffer. In the opposite direction of transfer, buffer 901a is initially the incoming buffer, buffer 901b is initially the holding buffer and buffer 901c is initially the outgoing buffer. Upon receipt of the cycle start delimiter for TSI ring 134b, logic 920 designates buffer 900b as the outgoing buffer and designates buffer 901a as the holding buffer and 901c as the incoming buffer. Once the start delimeter is received on TSI ring 134a, logic 921 designates buffer 900a as the holding buffer and buffer 900c becomes the incoming buffer. On the TSI ring 134b to 134a transfer side, logic 921 also designates buffer 901b as the outgoing buffer. When the next start delimeter is received on TSI ring 134b, logic circuits 920 and 921 designate buffer 900a as an outgoing buffer, buffer 900b is an incoming buffer and buffer 901c as a holding buffer. The next start delimiter received on TSI ring 134a results in buffer 900b becoming the incoming buffer, buffer 900c becoming the holding buffer and buffer 901a becoming the outgoing buffer. Note that logic circuits 920 and 921 may optionally be constructed as a single logic circuit. Table IV summarizes the data transfer between TSI rings 134a and 134b, as described above.

Figure 9:
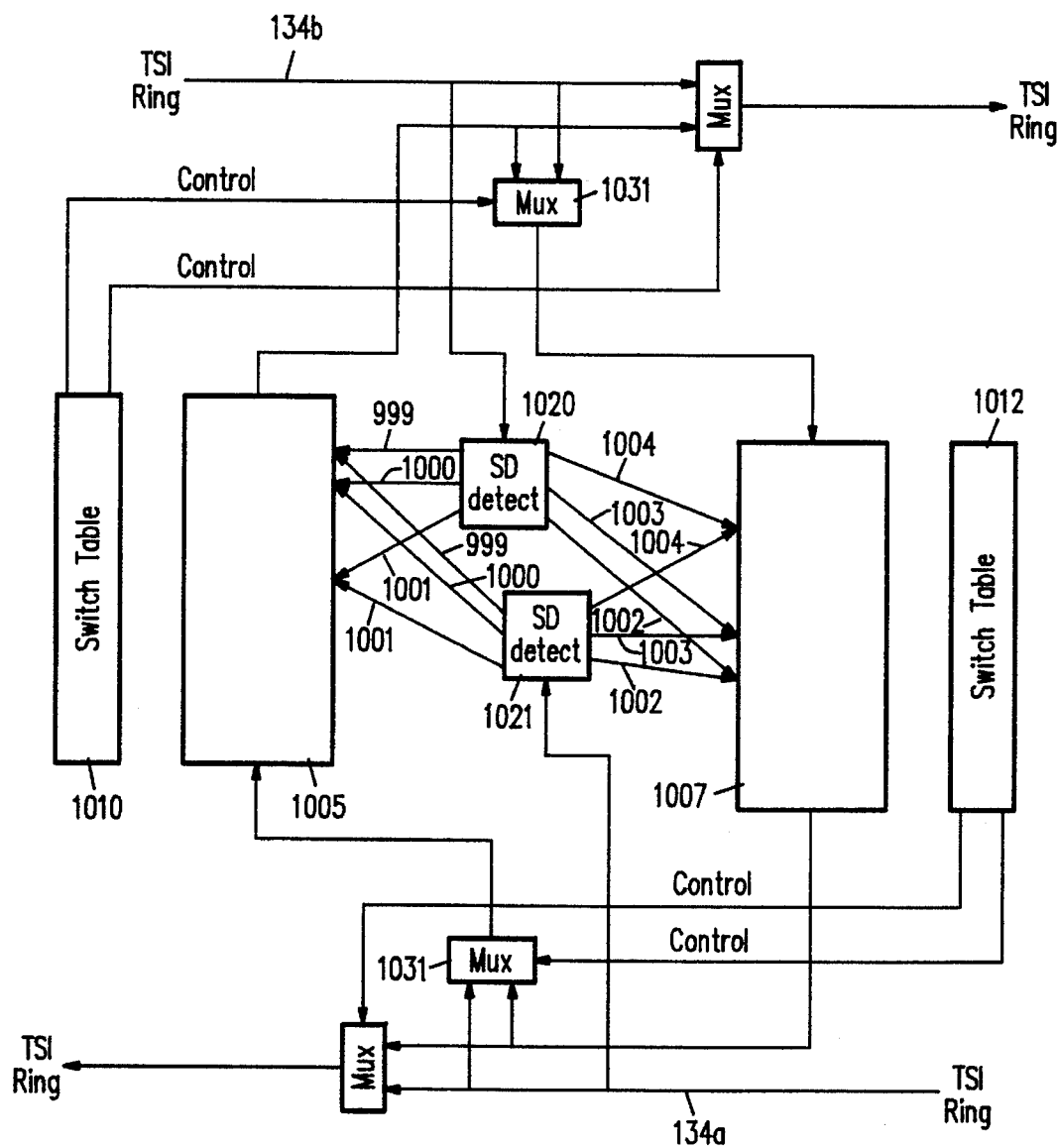
FIG. 9 is a schematic block diagram of another embodiment of an isochronous time slot data exchange switching mechanism according to the present invention.

FIG. 9 shows an alternate embodiment of the isochronous switching device. The switch of FIG. 9 uses three pointers 999–1001 and 1002–1004 instead of three ping pong buffers of FIG. 8 to accommodate for the skew. Along with the single buffers 1005 and 1007 are included switch tables 1010 and 1012, pointer logic, and cycle start delimiter and detection logic 1020 and 1021. Information in switch tables 1010 and 1012 contain the buffer location of the data to be switched out of buffers 1005 and 1007, internal loopback control, and, external exchanging control. Multiplexers 1030 and 1031 may be used for internal loopback of the byte of data.

As in FIG. 8, the switch table allows one to, many slot switching. The contents of the switch table are provided by the connection allocation algorithm and passed to the switch tables via a microprocessor interface. The addressing of the switch table corresponds to the 1537 time slots on the TSI ring or port (node) interface logic as previously described.

The three pointers of FIG. 9 identify the portions of buffers 1005 and 1007 to be used for incoming, skew and outgoing data. The circuit of FIG. 9 operates in a manner similar to that described in connection with FIG. 8. Table V summarizes the operation of the device of FIG. 9. If pointer 999 initially points to the incoming buffer section, pointer 1000 initially points to the holding buffer section, and pointer 1001 initially points to the outgoing buffer section. For one cycle of skew, the incoming buffer section just begins to fill as the outgoing buffer section is just finished emptying. Upon receipt of the cycle start delimiter on TSI ring 134b, the pointer logic designates buffer 1000 as the outgoing buffer, buffer 1002 as a holding buffer and buffer 1004 as an incoming buffer. When the cycle start delimiter is received on ring 134a, the pointer logic designates buffer 999 as a holding buffer, buffers 1001 as an incoming buffer and buffer 1003 is an outgoing buffer. When the next start delimeter is received on TSI ring 134b, the pointer logic circuits designate buffer 999 as an outgoing buffer, buffer 1003 is an incoming buffer and buffer 1004 as a holding buffer. The next start delimeter received on TSI ring 134a results in buffer 1000 becoming the incoming buffer, buffer 1001 becoming the holding buffer and buffer 1002 becoming the outgoing buffer. Table V summarizes the data transfer between TSI rings 134a and 134b, as described above.

In FIG. 2, the non-isochronous data from source 48c on node 2, 42b, is intended for the non-isochronous sink 48g on node 3, 42c, and thus the E data is transmitted via 50b across 46c to 54 b which demultiplexes the E data and conveys it to 60. Circuitry 60, in turn, conveys the E data to 54c which multiplexes it into the frame and transmits it across 46f to 50c which demultiplexes the data and provides it to 48g.

After the hub has received data from a node and conveyed it to a location for transmission to the destination node or nodes, the data which is intended for the destination node must be placed in a form suitable for transmission across the physical media 46 if intended for an attached node.

Figure 11:
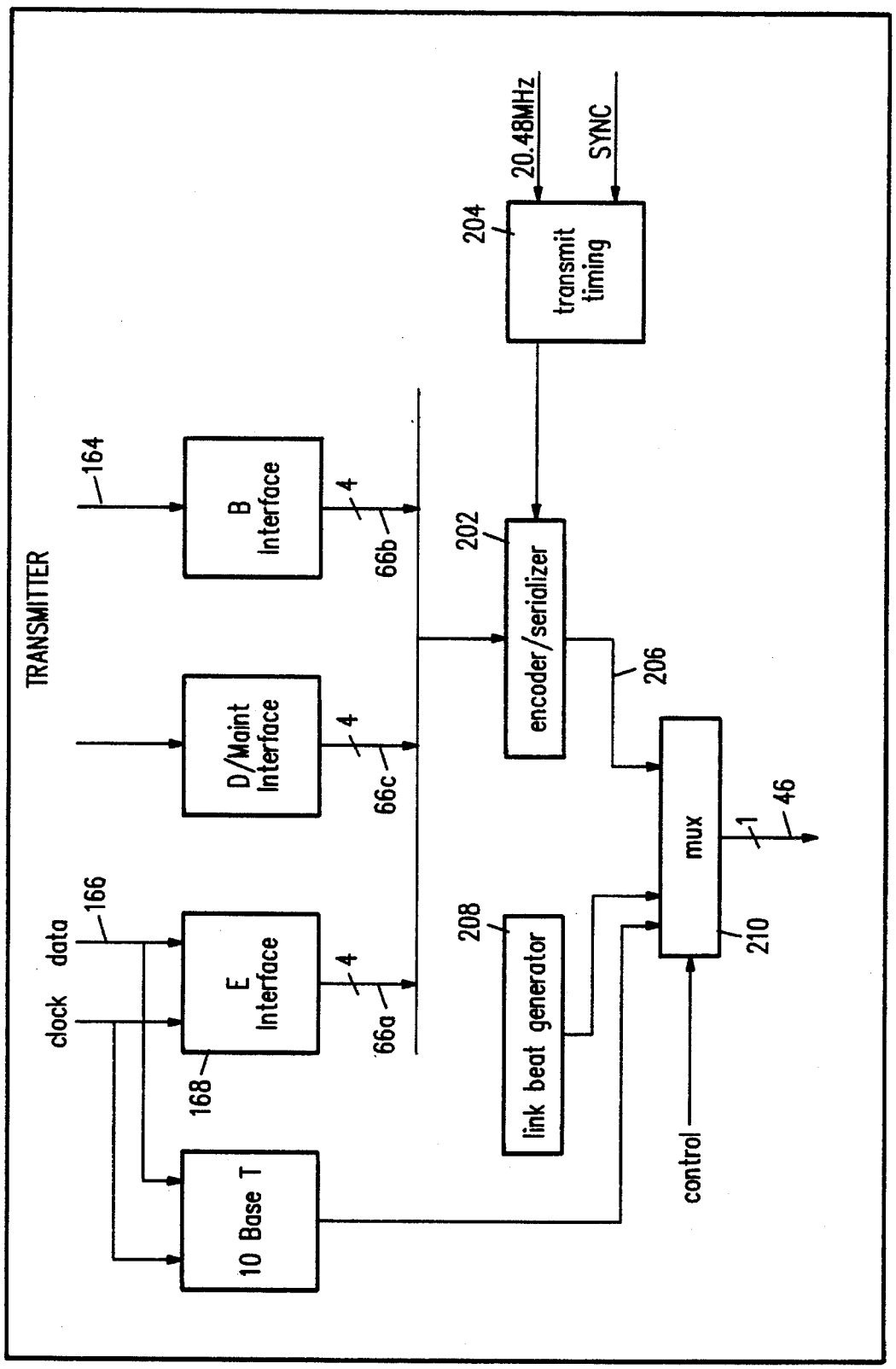
FIG. 11 is a schematic block diagram of a transmitter circuitry.

For example, as shown in FIG. 11, data 166 output by an ethernet repeater 60 is transformed by an E transmit interface 168 into a form suitable for multiplexing with other data streams, such as an isochronous data stream 66b and D channel and M channel data bits 66c.

Figure 10:
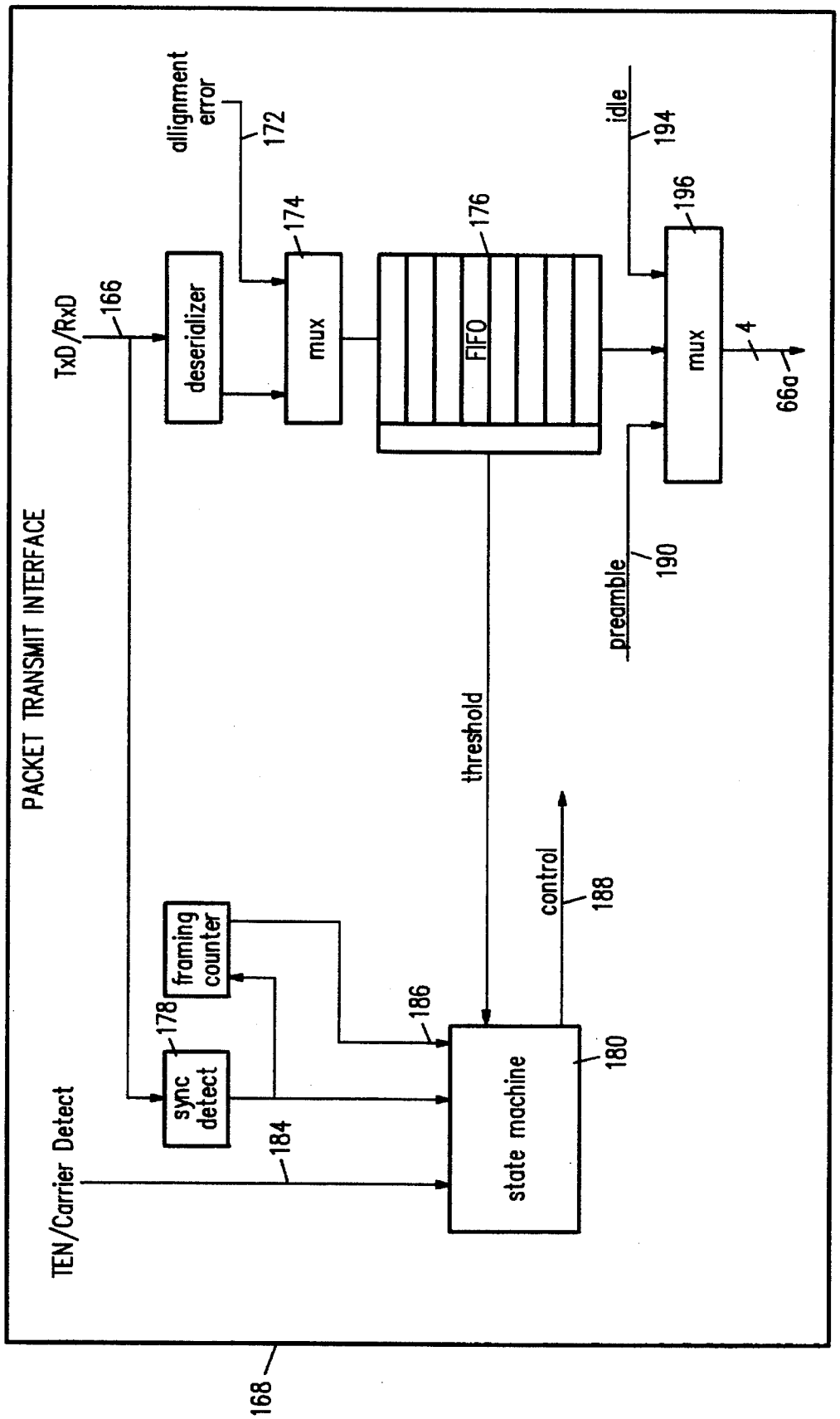
FIG. 10 is a schematic block diagram of a packet transmit interface according to an embodiment of the present invention.

An example of an E transmit interface 168 is depicted in FIG. 10. The transmit interface depicted in FIG. 10 is in general, the functional inverse of the E receive interface 59z depicted in FIG. 6. Data 166 could be supplied either in serial or parallel form. If in serial form, the data 166 is de-serialized and is then combined with any necessary alignment error bits 172 in a multiplexer 174, the output of which is conveyed to a FIFO 176. A sync detect circuit 178 extracts synchronization information from the repeater output 166 for conveying to a state machine 180. The state machine 180 also receives carrier detect information 184, framing counter information 186, and provides control signals 188 to the FIFO 176. Data is extracted from the FIFO 176 as needed to make up a frame for transmission over the media 46 as described below. The data output from the FIFO 176 is multiplexed with preamble bits 190 and "idle" (null carrier) bits 194 by a multiplexer 196. Operation of the E transmit interface is described more thoroughly in the application Ser. No. 07/970,329 (Attorney File No. 8332-316/ NS-2022), titled, "FRAME-BASED TRANSMISSION OF DATA," now U.S. Pat. No. 5,361,261.

The data 66a output from the E transmit interface 168 is provided along with isochronous data output 66b and maintenance and D channel data 66c to encoder serializer circuitry 202, as depicted in FIG. 11. The encoder/serializer 202 is configured substantially like the encoding circuitry found in the node and depicted in FIG. 4. Specifically, the encoder/serializer 202 provides a multiplexer for combining the three streams of data 66a, 66c, 66b, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described more thoroughly in application Ser. No. 07/971, 018 (Attorney File No. 8332-319/NS-2026), abandoned, titled, "NETWORK LINK ENDPOINT CAPABILITY DETECTION." The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42.

Figure 12:
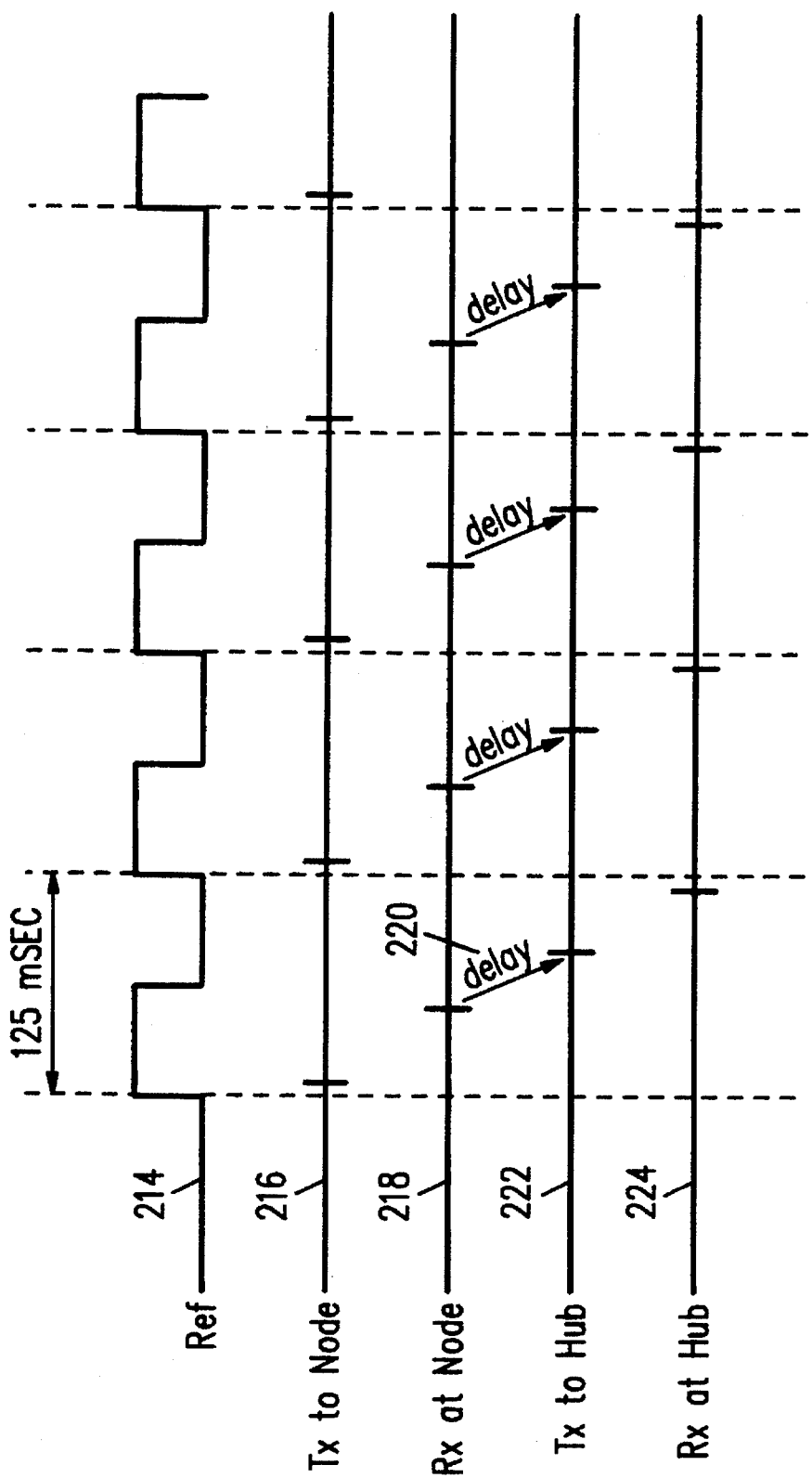
FIG. 12 is a timing diagram showing the relative timing of transmissions and receptions at the hub and nodes.

In one embodiment, it is desirable to control the timing of the transmissions from the nodes 42 to the hub 44 and those from the hub 44 to the nodes 42 to assist in reducing delay, jitter and minimizing the amount of buffering memory required. In particular, it is desired that the hub 44 should be able to transmit to the nodes, over media 46a, 46c, 46e at about the same time that data transmitted from the nodes over media 46b, 46d, 46f is received at the hub. FIG. 12 depicts a scheme for achieving this type of timing. As shown in FIG. 12, the timing can be synchronized with a 125 microsecond reference clock signal 214. In this example, the reference signal 214 provides an rising clock edge every 125 microseconds. The reference signal can be provided by any of a number of sources. Preferably, an embodiment of the present invention is configured to permit a reference signal 214 to be synchronized to an external clock reference, such as a reference signal from a wide area network or from a FDDI-II ring. The reference signal can be supplied through one of the nodes and transmitted to the hub for distribution to the other nodes, or can be supplied directly to the hub for distribution.

In applications where multiple wide area connections are made, one of the telephone connections (such as T1) can be chosen as the LAN reference. Connection can be made to the other WAN interfaces via data storage and buffers. The buffers would contain multiple frames of data to accommodate the phase and frequency skews between the frame structures apparent upon these connections and the chosen reference. The frame structure derived from the wide area network connection is subject to frequency jitter. According to an embodiment of the invention, the present network is able to accommodate this jitter provided that it is within specified bounds, and accordingly the jitter accommodation will not degrade the integrity of the isochronous channels.

Each node and the hub device will contain its own high-accuracy transmission encoding clock, typically a crystal oscillator. Thus, when viewed at the bit level, the links 46 are asynchronous to each other, being referenced only to the sourcing clock oscillator. Thus, according to an embodiment of the present invention, the synchronous frame structure is conveyed over asynchronous links.

At the beginning of a cycle, the hub 44 will begin to transmit a frame to the node, as indicated by the timing marks on time line 216. Because of the line delays in the physical media, the time at which the nodes will receive the frame transmitted by the hub will lag the time when they were sent out from the hub as shown by time line 218. In order to provide for the desired timing described above, a delay 220 is introduced in the timing scheme before the node begins transmission of the next frame up to the hub 222. The delay 220 has a value such that, taking into account the latency introduced by transmission over physical media 46 the hub will begin receiving the transmitted frame at times 224 approximately coinciding with the rising edges of the clock signals 214.

Figure 13:
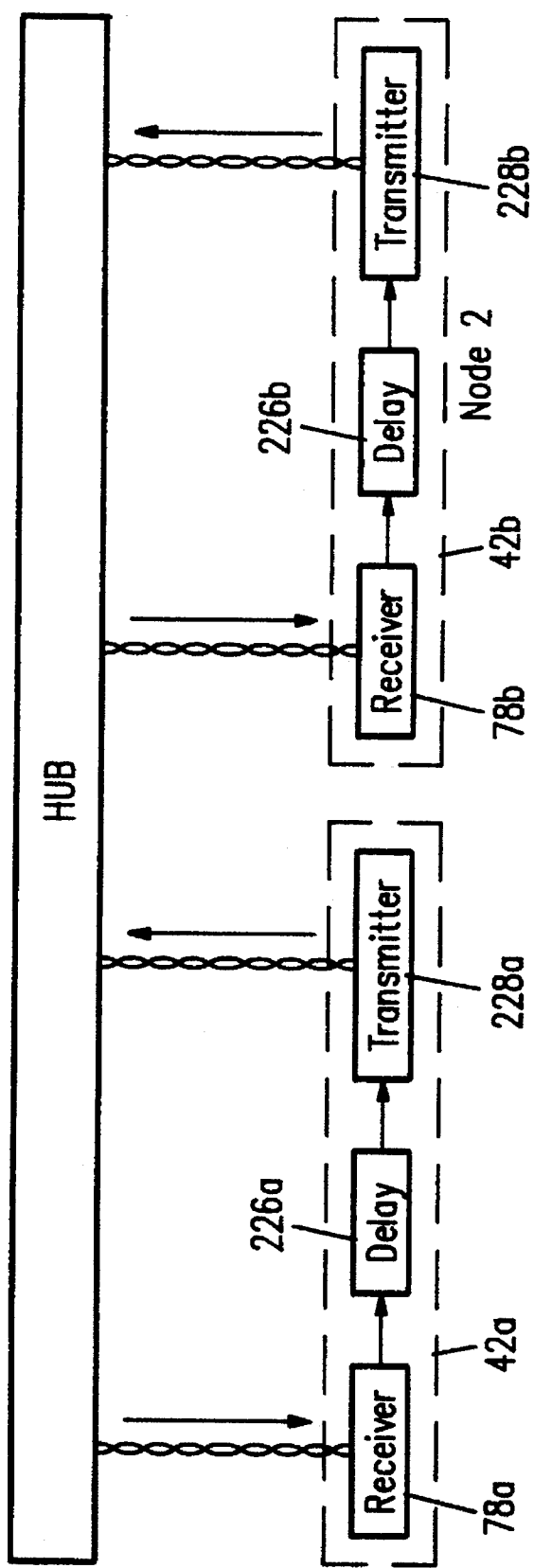
FIG. 13 is a schematic block diagram showing node receivers and transmitters coupled by a delay circuit.

One way of introducing the delay 220 is depicted in FIG. 13. The delay may be introduced by inserting delay circuitry 226a, 226b between the receiving circuitry 78a, 78b of the nodes 42a, 42b and the transmitting circuitry 228a, 228b of the nodes 42a, 42b. Because the latency of physical media will vary from node to node, typically depending on the length of the links, the length of the delay 226a which is appropriate for a given node may be different from the delay 226b which is appropriate for another node. Accordingly, it is possible to detect the latency or delay of a particular link and use this latency to calculate an optimal delay. The calculated optimal delay can then be programmed into the delay circuitry 228a, 228b as appropriate. This is described in more detail in commonly-assigned application Ser. No. 07/970,313 (Attorney File No 8332-318/NS-2027) titled, "ISOCHRONOUS LINK PROTOCOL," filed on Nov. 2, 1993, U.S. Pat. No. 5,406,559, and incorporated herein by reference. In this way, the cycle reference provided to the node transmitter has the proper phase to assure the timing described above.

The timing scheme described guarantees that the cycle received from the node will arrive slightly sooner than the next cycle will be transmitted from the hub. A small FIFO can be inserted into the hub's received data stream to accurately align the arrival of the cycle. In certain applications, it will also be advantageous to provide a FIFO in the node which would hold the data synchronized with the received cycle reference until it is to be transmitted. Provision of these FIFOs is described in more detail in commonly-assigned application Ser. No. 07/969,917 (Attorney File No. 8332- 320/NS-2028), titled "APPARATUS AND METHOD FOR ACCOMMODATING CABLE LENGTH DELAYS USING ISOCHRONOUS FIFOING" filed on Nov. 2, 1992 and now abandoned.

In light of the above description, a number of advantages of the present system can be seen. The described system herein provides a channel for isochronous data such that the bandwidth for a particular isochronous source does not necessarily decrease as isochronous traffic on the system increases. The isochronous data transfer is interoperable with the transfer of non-isochronous data in a fashion that is transparent to the media access controllers and to the application software. The system also provides for inter-operating isochronous and non-isochronous data transfer while maintaining the data transfer rate achieved for non-isochronous data in previously in-place systems. Furthermore, the present system can convey both the non-isochronous data and the isochronous data over in-place physical media without degrading the non-isochronous data transfer rate compared to the rate previously carried by the same physical media. Isochronous data is conveyed with a minimized or reduced amount of delay and jitter and with minimized or reduced requirements for buffer memory. Bandwidth to be used for a particular isochronous source is selectable with a specified granularity, such as 64 Kbits/sec granularity, so that isochronous sources and sinks have available to them an amount of bandwidth which is both selectable and sustainable. The disclosed system provides a data exchange mechanism which is compatible with standard media access controller devices. Thus, currently available hardware and associated software may be used over the physical links. Incremental upgrade of equipment can be made as desired. The hub can perform call connection establishment, channel allocation and isochronous channel management, preferably using source/destination information provided over the D channel.

A number of modifications and variations of the invention can also be used. It is possible to use some aspects of the invention without using other aspects. For example, it is possible to provide a dedicated bandwidth for isochronous traffic without using a network which receives non-isochronous data from a ethernet media access controller. It is possible to transmit non-isochronous-sourced data using a continuously-recurring frame structure without providing a plurality of hubs which are inter-connected. At least some aspects of the present invention can be implemented in a non-star-topology, such as by communicating isochronous and non-isochronous data which is time-multiplexed into a recurring frame structure, directly between two nodes. Other types of non-isochronous sources and sinks than those discussed above can also be used, including token bus, ATM, video phones, video servers, computer work stations or other networking schemes. Other frame structures can be used to provide more or less bandwidth for various types of data such as isochronous data, non-isochronous data, and D channel data. Channels in addition to isochronous, non-isochronous, D channel, and M channels could be provided. Multiplexing both packet-structured non-isochronous data and non-packet-non-isochronous data (such as token ring data) can also be achieved.

Although the present invention has been described by way of preferred embodiments and certain variations and modifications, other variations and modifications can also be used, the invention being defined by the following claims.

TABLE 1A

BLOCK 0:

| | | | | | | | | | | | | | | | | |
|---|---|---|---|---|---|---|---|---|---|---|---|---|---|---|---|---|
| J | K | E | B | E | B | E | B | E | B | E | B | E | B | E | E | Group 0 |
| E | E | E | B | E | B | E | B | E | B | E | B | E | B | E | E | Group 1 |
| E | E | E | B | E | B | E | B | E | B | E | B | E | B | E | E | Group 2 |
| E | E | E | B | E | B | E | B | E | B | E | B | E | B | E | E | Group 3 |
| E | E | E | B | E | B | E | B | E | B | E | B | E | B | E | E | Group 4 |
| E | E | E | B | E | B | E | B | E | B | E | B | E | B | E | E | Group 5 |
| E | E | E | B | E | B | E | B | E | B | E | B | E | B | E | E | Group 6 |
| E | E | E | B | E | B | E | B | E | B | E | B | E | B | E | E | Group 7 |

BLOCK 1:

| | | | | | | | | | | | | | | | | |
|---|---|---|---|---|---|---|---|---|---|---|---|---|---|---|---|---|
| M | M | E | B | E | B | E | B | E | B | E | B | E | B | E | E | Group 8 |
| E | E | E | B | E | B | E | B | E | B | E | B | E | B | E | E | Group 9 |
| E | E | E | B | E | B | E | B | E | B | E | B | E | B | E | E | Group 10 |
| E | E | E | B | E | B | E | B | E | B | E | B | E | B | E | E | Group 11 |
| E | E | E | B | E | B | E | B | E | B | E | B | E | B | E | E | Group 12 |
| E | E | E | B | E | B | E | B | E | B | E | B | E | B | E | E | Group 13 |
| E | E | E | B | E | B | E | B | E | B | E | B | E | B | E | E | Group 14 |
| E | E | E | B | E | B | E | B | E | B | E | B | E | B | E | E | Group 15 |

BLOCK 2:

| | | | | | | | | | | | | | | | | |
|---|---|---|---|---|---|---|---|---|---|---|---|---|---|---|---|---|
| D | D | E | B | E | B | E | B | E | B | E | B | E | B | E | E | Group 16 |
| E | E | E | B | E | B | E | B | E | B | E | B | E | B | E | E | Group 17 |
| E | E | E | B | E | B | E | B | E | B | E | B | E | B | E | E | Group 18 |
| E | E | E | B | E | B | E | B | E | B | E | B | E | B | E | E | Group 19 |
| E | E | E | B | E | B | E | B | E | B | E | B | E | B | E | E | Group 20 |
| E | E | E | B | E | B | E | B | E | B | E | B | E | B | E | E | Group 21 |
| E | E | E | B | E | B | E | B | E | B | E | B | E | B | E | E | Group 22 |
| E | E | E | B | E | B | E | B | E | B | E | B | E | B | E | E | Group 23 |

BLOCK 3:

| | | | | | | | | | | | | | | | | |
|---|---|---|---|---|---|---|---|---|---|---|---|---|---|---|---|---|
| E | M | E | B | E | B | E | B | E | B | E | B | E | B | E | E | Group 24 |
| E | E | E | B | E | B | E | B | E | B | E | B | E | B | E | E | Group 25 |
| E | E | E | B | E | B | E | B | E | B | E | B | E | B | E | E | Group 26 |
| E | E | E | B | E | B | E | B | E | B | E | B | E | B | E | E | Group 27 |
| E | E | E | B | E | B | E | B | E | B | E | B | E | B | E | E | Group 28 |
| E | E | E | B | E | B | E | B | E | B | E | B | E | B | E | E | Group 29 |
| E | E | E | B | E | B | E | B | E | B | E | B | E | B | E | E | Group 30 |
| E | E | E | B | E | B | E | B | E | B | E | B | E | B | E | E | Group 31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

TABLE 1B

BLOCK 0:

| | | | | | | | | | | | | | | | | |
|---|---|---|---|---|---|---|---|---|---|---|---|---|---|---|---|---|
| J | K | B | B | B | B | B | B | B | B | B | B | B | B | B | B | Group 0 |
| B | B | B | B | B | B | B | B | B | B | B | B | B | B | B | B | Group 1 |
| B | B | B | B | B | B | B | B | B | B | B | B | B | B | B | B | Group 2 |
| B | B | B | B | B | B | B | B | B | B | B | B | B | B | B | B | Group 3 |
| B | B | B | B | B | B | B | B | B | B | B | B | B | B | B | B | Group 4 |
| B | B | B | B | B | B | B | B | B | B | B | B | B | B | B | B | Group 5 |
| B | B | B | B | B | B | B | B | B | B | B | B | B | B | B | B | Group 6 |
| B | B | B | B | B | B | B | B | B | B | B | B | B | I | I | | Group 7 |

BLOCK 1:

| | | | | | | | | | | | | | | | | |
|---|---|---|---|---|---|---|---|---|---|---|---|---|---|---|---|---|
| M | M | B | B | B | B | B | B | B | B | B | B | B | B | B | B | Group 8 |
| B | B | B | B | B | B | B | B | B | B | B | B | B | B | B | B | Group 9 |
| B | B | B | B | B | B | B | B | B | B | B | B | B | B | B | B | Group 10 |
| B | B | B | B | B | B | B | B | B | B | B | B | B | B | B | B | Group 11 |
| B | B | B | B | B | B | B | B | B | B | B | B | B | B | B | B | Group 12 |
| B | B | B | B | B | B | B | B | B | B | B | B | B | B | B | B | Group 13 |
| B | B | B | B | B | B | B | B | B | B | B | B | B | B | B | B | Group 14 |
| B | B | B | B | B | B | B | B | B | B | B | B | B | I | I | | Group 15 |

BLOCK 2:

| | | | | | | | | | | | | | | | | |
|---|---|---|---|---|---|---|---|---|---|---|---|---|---|---|---|---|
| D | D | B | B | B | B | B | B | B | B | B | B | B | B | B | B | Group 16 |
| B | B | B | B | B | B | B | B | B | B | B | B | B | B | B | B | Group 17 |
| B | B | B | B | B | B | B | B | B | B | B | B | B | B | B | B | Group 18 |
| B | B | B | B | B | B | B | B | B | B | B | B | B | B | B | B | Group 19 |
| B | B | B | B | B | B | B | B | B | B | B | B | B | B | B | B | Group 20 |
| B | B | B | B | B | B | B | B | B | B | B | B | B | B | B | B | Group 21 |

TABLE 1B-continued

| | | | | | | | | | | | | | | | | |
|---|---|---|---|---|---|---|---|---|---|---|---|---|---|---|---|---|
| B | B | B | B | B | B | B | B | B | B | B | B | B | B | B | B | Group 22 |
| B | B | B | B | B | B | B | B | B | B | B | B | B | B | I | I | Group 23 |
| | | | | | | | BLOCK 3: | | | | | | | | | |
| I | M | B | B | B | B | B | B | B | B | B | B | B | B | B | B | Group 24 |
| B | B | B | B | B | B | B | B | B | B | B | B | B | B | B | B | Group 25 |
| B | B | B | B | B | B | B | B | B | B | B | B | B | B | B | B | Group 26 |
| B | B | B | B | B | B | B | B | B | B | B | B | B | B | B | B | Group 27 |
| B | B | B | B | B | B | B | B | B | B | B | B | B | B | B | B | Group 28 |
| B | B | B | B | B | B | B | B | B | B | B | B | B | B | B | B | Group 29 |
| B | B | B | B | B | B | B | B | B | B | B | B | B | B | B | B | Group 30 |
| B | B | B | B | B | B | B | B | B | B | B | B | B | B | I | I | Group 31 |

JK = Frame Synchronization Pattern
M = 4 Maintenance Channel Bits
D = D Channel
I = Idle Data
B = Isochronous Channel

TABLE II

| Symbol | Encoded (5 bit) | Description |
|---|---|---|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

TABLE III

| Channel | Bytes/Frame | Bits/Frame | Kbits/sec | Usage |
|---|---|---|---|---|
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
| | 256.0 | 2,048 | 16,384 | Mbits/sec |

TABLE IV

| | Buffer No. | | | | | |
|---|---|---|---|---|---|---|
| | 900a | 900b | 900c | 901a | 901b | 901c |
| Initial | I | H | O | I | H | O |
| SD on 134b | — | O | — | H | — | I |
| SD on 134a | H | — | I | — | O | — |
| SD on 134b | O | — | — | — | I | H |
| SD on 134a | — | I | H | O | — | — |

TABLE V

| | Pointer No. | | | | | |
|---|---|---|---|---|---|---|
| | 999 | 1000 | 1001 | 1002 | 1003 | 1004 |
| Initial | I | H | O | I | H | O |
| SD on 134b | — | O | — | H | — | I |
| SD on 134a | H | — | I | — | O | — |
| SD on 134b | O | — | — | — | I | H |
| SD on 134a | — | I | H | O | — | — |

I = Incoming
H = Holding
O = Outgoing

What is claimed is:

1. Apparatus for communicating between first and second entities in a time slot interchange fashion, the apparatus comprising:

a storage memory having first, second and third memory sections;

wherein said first memory section is coupled to receive data from said first entity;

wherein said second memory section is adapted to store data received from said first entity prior to receipt of said data by said first memory section;

wherein said third memory section is coupled to said second entity and outputs to said second entity data received from said first entity at a time previous to receipt of said data stored in said second memory section;

means coupled to said first and second entities for receiving a first cycle start reference from said first entity indicating the start of a cycle of data of said first entity and a second cycle start reference from said second entity indicating the start of a cycle of data of said second entity, respectively; and control means coupled to said means for receiving for alternately assigning first, second and third physical storage locations to said first, second and third memory sections, respectively, responsive to receipt of said first and second cycle start references.

2. The apparatus of claim 1 wherein said first, said second and said third memory sections each comprise an individual ping pong buffer.

3. The apparatus of claim 1 wherein said storage memory is comprised of a single physical memory unit.

4. The apparatus of claim 1, wherein said control means designates said third memory section responsive to said second cycle start reference and designates said first and second memory sections responsive to said first cycle start reference.

5. The apparatus of claim 1 wherein said data are isochronous.

6. The apparatus of claim 1 wherein said third memory section is adapted to output said data to said second entity in a different order than as received from said first entity.

7. The apparatus of claim 1 wherein said means for receiving is comprised of cycle start detection logic.

8. The apparatus of claim 1 wherein said control means is comprised of cycle start detection logic.

9. Apparatus for communicating between first and second stations in a data communication system over a link, said data communication system including a plurality of data sources and sinks, a first of said sources and sinks configured to receive or transmit data isochronously and a second of said sources and sinks configured to transmit data non-isochronously, the apparatus comprising:

a first receiver and a first transmitter in said first station;

said link coupling said first station with said second station;

said second station being coupled to both said first and second sources and sinks;

a second transmitter in said second station adapted to transmit data to said first receiver;

a multiplexer in said second station adapted to permit the transmission of data from both said first and second sources and sinks over said link as multiplexed data, said multiplexer providing a dedicated bandwidth for data originating from an isochronous source, including said first of said sources and sinks; and means, coupled to said first and second stations, for exchanging said isochronous data over said link including:

a storage memory having first, second and third memory sections;

wherein said first memory section is coupled to receive data from said second station;

wherein said second memory section is adapted to store data received from said second station prior to receipt of said data by said first memory section;

wherein said third memory section is coupled to said first station for outputting data received from said second station at a time previous to receipt of said data stored in said second memory section, to said first station;

means coupled to second and first stations for receiving a first cycle start reference from said second station indicating the start of a cycle of data of said first station and a second cycle start reference from said first station indicating the start of a cycle of data of said second station, respectively; and control means coupled to said means for receiving for alternately assigning first, second, and third physical storage locations to said first, second and third memory sections responsive to receipt of said first and second cycle start references.

10. The apparatus of claim 9 wherein said third memory section is adapted to output said data to said first station in a different order than as received from said second station.

11. The apparatus of claim 9 wherein said means for receiving is comprised of cycle start detection logic.

12. The apparatus of claim 9 wherein said control means is comprised of cycle start detection logic.

13. In a data communications system, a method for exchanging data between first and second entities in a time slot interchange fashion comprising the steps of:

receiving data from said first entity and placing said data in a first portion of memory;

storing data received from said first entity prior to receipt of said data by said first portion of memory, in a second portion of memory;

outputting to said second entity, from a third portion of memory, data received by said third portion of memory from said first entity at a time earlier than said data is received by said second portion of memory;

alternately designating a first one of three physical memory locations for said first portion of memory and a second one of said three physical memory locations for said second portion of memory upon receipt of a first cycle frame reference from said first entity; and alternately designating a third one of said three physical memory locations for said third portion of memory upon receipt of a second cycle frame reference from said second entity such that said three physical memory locations are alternately designated for said first, second and third portions of memory.

14. The method of claim 13 wherein the designating steps further comprise the steps of designating individual ones of three ping pong buffers as said first, second and third memory portions, respectively.

15. The method of claim 13 wherein said designating steps comprise the steps of designating first, second and third physical regions of a common memory, respectively.

16. The method of claim 13 wherein said data is isochronous.

17. The method of claim 13 wherein said third portion of memory is adapted to output said data to said second entity in a different order than as received from said first entity.

18. Apparatus for exchanging data between first and second entities in a time slot interchange fashion, the apparatus comprising:

a buffer memory coupled to said first and second entities comprised of first, second and third physical memory sections;

means coupled to said first and second entities for receiving a cycle start reference from said first entity indicating the start of a cycle of data from said first entity and a cycle start reference from said second entity indicating the start of a cycle of data from said second entity; and means coupled to said means for receiving for designating the first, second and third physical memory sections to alternately:

(1) input data from said first entity responsive to receipt by said means for receiving of a cycle start reference from said first entity, (2) hold data received from said first entity responsive to a preceding cycle start reference from said first entity upon receipt by said means for receiving of said cycle start reference from said first entity, and (3) output data received during a further preceding cycle start reference from said first entity to said second entity upon receipt by said means for receiving of a first cycle start reference from said second entity.

19. The apparatus of claim 18 wherein said data is isochronous.

20. The apparatus of claim 18 wherein said third physical memory section is adapted to output said data to said second entity in a different order than as received from said first entity.

21. The apparatus of claim 18 wherein said means for receiving is comprised of cycle start detection logic.

22. The apparatus of claim 18 wherein said means for designating is comprised of cycle start detection logic.

23. The apparatus of claim 18 wherein (1) said means for designating, upon receipt of said cycle start reference from said first entity,
  (a) designates said first physical memory section to input data from a cycle of data from said first entity corresponding to said cycle start reference from said first entity and
  (b) designates said second physical memory section to hold data which was inputted to said second physical memory section from a cycle of data from said first entity corresponding to a preceding cycle start reference from said first entity, and (2) said means for designating, upon receipt of said cycle start reference signal from said second entity, designates said third physical memory section to output data from a further preceding cycle of data from said first entity.

24. In a data communications system, a method for exchanging data between first and second entities in a time slot interchange fashion comprising the steps of:

inputting first data from said first entity into a first memory section upon receiving a first cycle start reference from said first entity indicating the start of a first cycle of data from said first entity;

outputting said first data to said second entity from said first memory section upon receiving a first cycle start reference from said second entity indicating a start of a new cycle of data from said second entity;

inputting second data from said first entity into a second memory section upon receiving a second cycle start reference from said first entity;

outputting said second data to said second entity from said second memory section upon receiving a second cycle start reference from said second entity indicating the start of a second cycle of data from said second entity;

inputting third data from said first entity into a third memory section upon receiving a third cycle start reference from said first entity; and outputting said third data from said second entity from said third memory section upon receiving a third cycle start reference from said second entity indicating the start of a third cycle of data from said second entity.

25. The method of claim 24 wherein said first, second and third data are isochronous.

26. The method of claim 24 herein said first data is adapted to be output from said memory section in a different order than as input to said first memory section.

* * * * *